United States Patent
Braathen et al.

(10) Patent No.: US 6,305,233 B1
(45) Date of Patent: Oct. 23, 2001

(54) DIGITAL SPEED DETERMINATION IN ULTRASONIC FLOW MEASUREMENTS

(75) Inventors: Colin Walter Braathen, Turramurra; Noel Bignell, Anandale; Charles Malcolm Welsh, Kariong; Laurence Michael Besley, Mt. Colah, all of (AU)

(73) Assignees: Commonwealth Scientific and Industrial Research Organisation, Campbell; AGL Consultancy Pty Ltd., Sydney, both of (AU)

( * ) Notice: Subject to any disclaimer, the term of this patent is extended or adjusted under 35 U.S.C. 154(b) by 0 days.

(21) Appl. No.: 09/043,625

(22) PCT Filed: Oct. 17, 1996

(86) PCT No.: PCT/AU96/00653

§ 371 Date: Jul. 6, 1998

§ 102(e) Date: Jul. 6, 1998

(87) PCT Pub. No.: WO97/14936

PCT Pub. Date: Apr. 24, 1997

(30) Foreign Application Priority Data

Oct. 19, 1995 (AU) .................................................. PN6060

(51) Int. Cl.⁷ ...................................................... G01F 1/00
(52) U.S. Cl. ..................................... 73/861.28; 73/861.27
(58) Field of Search .......................... 73/861.23, 861.18, 73/861.25, 861.26, 861.27, 861.28, 861.29, 861.31

(56) References Cited

U.S. PATENT DOCUMENTS 4,483,202 * 11/1984 Ogura et al. ...................... 73/861.27
5,035,147 * 7/1991 Woodward ........................ 73/861.28
5,206,836   4/1993 Holzhausen et al. .
5,553,505 * 9/1996 Bignell et al. ..................... 73/861.28
5,650,571 * 7/1997 Freud et al. ....................... 73/861.06
5,818,735 * 10/1998 Tigwell et al. ....................... 364/569

FOREIGN PATENT DOCUMENTS 0 056 137A2   7/1982 (EP) .
WO 93/00570  1/1993 (WO) .
WO94/16341   7/1994 (WO) .
WO 94/20821  9/1994 (WO) .

OTHER PUBLICATIONS

Derwent Abstract Accession No. A5699 J/48, Class S02 SU 903706A (Grachev S.M.) Feb. 9, 1982 abstract copy of International Search Report PCT/AU 96/00653.

* cited by examiner

Primary Examiner—Harshad Patel
(74) Attorney, Agent, or Firm—Rockey, Milnamow & Katz, Ltd.

(57) ABSTRACT

A method and device (60) is described which measures the speed of a flowing fluid (F) by measuring the difference in time taken for an ultrasonic signal to travel first upstream and then downstream in the fluid. In each direction the device (60) calculates the time taken for an ultrasonic wave packet emitted by one ultrasonic transducer (62) to be received by another (63). The method used consists of the digitisation (85) of the received waveform and the subsequent identification of waveform features by comparison with a standard template of the waveform. The position in time of these features is then determined with respect to a high speed clock (70). The results are then used in a weighted computation to determine the time of arrival of the waveform at the transducer (63).

46 Claims, 14 Drawing Sheets

DIGITAL SPEED DETERMINATION IN ULTRASONIC FLOW MEASUREMENTS

FIELD OF THE INVENTION

The present invention relates to a device for measuring the flow speed of a moving fluid and which utilizes ultrasonics and digital speed determination.

DESCRIPTION OF THE RELATED ART

The measurement of the difference in propagation time for the upstream and downstream travel of an ultrasonic signal in a moving fluid is an established method used to measure the rate of flow of that fluid. The ultrasonic signal used for such purposes typically consists of a wave packet of sinusoidal shape with peaks of differing amplitudes. An example of such a wave packet is depicted in FIG. 3 which shows an electronically received ultrasonic signal 40. The problem of accurately determining the time of arrival of such a signal is generally considered to involve two specific criteria.

The first is the unique identification of a particular part of the received signal 40 that can be used as a timing reference. The part usually chosen is a point at which one cycle of the wave crosses the signal axis 42, a so-called "zero crossing". The identification of a particular zero crossing is conventionally done with reference to the magnitude of the largest peak 41 in the received signal 40. This method has several difficulties. The first is that the size of the largest peak 41 can vary considerably, and is dependent on the conditions under which the signal is being transmitted. For example, if ultrasonic transducers based upon piezoelectric materials such as PVDF are being used, the size of the peak 41 can change by a factor of 30 as the fluid temperature changes from +60 to −20° C. Even more importantly, for a wave packet in a tube, the particular cycle of the received signal 40 where the largest peak 41 occurs often changes, and is dependent on conditions such as temperature and frequency. This is largely because the maximum of such a signal often, but not always, occurs where secondary acoustic modes make up a major part of the received signal 40. Generally depicted at 43 in FIG. 3 is an example of the influence of secondary and other high order acoustic modes These secondary modes are much more affected by temperature and frequency than is the plane wave (primary mode). The condition where two peaks within the wavepacket are identical in magnitude is one which the zero-crossing method finds particularly difficult to accommodate.

The second criterion is the identification of the arrival time of the identified zero-crossing, which is generally the zero-crossing 44 immediately after the largest peak 41, is received at the signal detector with respect to the time scale being used. The accuracy of the timing of the arrival of the wave is usually limited to one clock pulse, this time interval therefore represents the uncertainty of the measurement.

International Patent Publication No. WO 93/00569 entitled "An Electronic Fluid Flow Meter" discloses an acoustic wave packet detection arrangement and associated flow measuring apparatus that embodies one solution to the above problems. Such an arrangement utilizes envelope detection and an arming method for zero-crossing detection. International Patent Publication Nos. WO 93/00570 and WO 94/20821 each disclose different methods for lessening the propagation of high order acoustic modes which, as discussed above, can contribute significantly to the received wave packet and thus cause timing errors. U.S. Pat. No. 5,206,836 discloses a digital arrangement for determining, based on linear regression about a single zero-crossing, the arrival of a wave packet.

SUMMARY OF THE INVENTION

It is an object of the present invention to provide a measurement device and method for ultrasonic timing which permits both the unique identification of a part of an ultrasonic signal and the timing of the arrival of that part of the signal at a detector.

In accordance with a first aspect of the present invention there is disclosed a method of detecting an arrival time at a transducer of an acoustic wave packet transmitted at a predetermined frequency, said method comprising the steps of:

(a) transmitting an acoustic wave packet at a predetermined frequency;

(b) detecting at a transducer the acoustic wave packet and producing an analogue signal output;

(c) converting, at a sampling frequency, the analogue signal output from said transducer into digital signal data having consequential spacing;

(d) determining a measurement portion of said digital signal data, said measurement portion corresponding to a response of said transducer to said acoustic wave packet;

(e) determining from said measurement portion a plurality of slopes $S_i$ for a corresponding plurality i, where i is an integer between zero and 20, of measurement segments of said response, each of said segments being about a signal level value V; and (f) determining from at least selected ones of said slopes $S_i$, an arrival time t of said acoustic wave packet.

Generally, the method comprises the further step, between steps (e) and (f) of:

(ea) determining, for selected ones of said segments, a corresponding measurement time $A_i$ indicative of a time at which said response intercepts said signal level value V;

wherein step (f) comprises determining said arrival time t from said corresponding measurement times $A_i$.

Preferably, a further step is provided, between steps (e) and (ea) of:

(eaa) matching said slopes $S_i$ with a corresponding reference set of slopes $P_j$ to determine a measurement position of each of said segments in said measurement portion;

wherein step (ea) comprises determining said corresponding measurement times $A_i$ from the corresponding one of said measurement positions.

Generally, step (e) comprises allocating a set of points including an integer k number of points of said digital signal data to each said measurement segment i, each said measurement segment i being centered around two adjacent points, each of the two adjacent points having a value which lies on alternative sides of said signal level value V, fitting a straight line to each set of points, and then determining the slope $S_i$ of each said straight line. Advantageously, the straight line comprises a line joining the two adjacent points. Preferably the value of k is related to a ratio of the sampling frequency to said predetermined frequency at which said acoustic wave packet is transmitted, and to the consequential spacing of said digital signal data in said measurement portion. Typically, k is equal to one eighth of the number of points per cycle. Most preferably, the value of k is 10.

In one advantageous arrangement, each slope $P_j$ of said reference set of slopes is associated with a specific position parameter n, said specific position parameter n marking a position corresponding to a signal polarity transition within said wave packet, wherein each specific position parameter n, corresponds to an integral number of half-wave periods of said wave packet between a beginning of said wave packet corresponding to the arrival time of the wave packet and the corresponding signal polarity transition within said wave packet.

In a preferred implementation, step (f) comprises the following sub-steps:
- (fa) assigning a weighting factor $W_i$ to each of said measurement times $A_i$ based upon the corresponding position parameter n;
- (fb) selecting a number m of said measurement times $A_i$ for using in the determination of the arrival time t;
- (fc) determining a mean half-wave period $\tau$ from time intervals between adjacent ones of said number m of selected measurement times $A_i$;
- (fd) determining, for each of the number m of selected measurement times $A_i$, an estimated arrival time $t_i$ of said wave packet at the transducer;
- (fe) determining a sum, over the number m of measurement times $A_i$, of a product of the weighting factor $W_i$ assigned to each of said measurement times and the corresponding estimated arrival time $t_i$; and
- (ff) determining the arrival time t of said acoustic wave packet by dividing the sum determined in step (fe) by a sum of each weighting factor $W_i$ assigned to each of the number m of measurement times.

Generally, each weighting factor $W_i$, is proportional to the slope $S_i$, of the corresponding one of said segments. Typically, m can take a value from 2 to 20. A preferred value of m is 6.

Advantageously, step (fd) comprises determining the estimated arrival time $t_i$ using the expression $t_i = A_i - n \cdot \tau$, wherein $A_i$ are the measurement times, n is the corresponding position parameter, and $\tau$ is the mean half-wave period.

In the preferred embodiment, the sampling frequency is used to generate said acoustic wave packet and preferably said predetermined frequency at which said acoustic wave packet is transmitted is a sub-multiple of said sampling frequency.

Generally the signal level value is derived from averaging that digital signal data received in advance of the measurement portion. Also, step (a) typically comprises the continuous conversion of the signal.

In accordance with a second aspect of the present invention there is disclosed a method of determining the propagation time of an acoustic wave packet transmitted between two ultrasonic transducers, said method comprising the steps of:
- (g) starting a clock operating at a clock operating [predetermined] frequency;
- (h) simultaneously with a transition of said clock, the steps of:
  - (ha) energizing a first one of two transducers to output an acoustic wave packet at an energizing frequency which is lower than said clock operating frequency, and
  - (hb) maintaining said clock as a timing reference for subsequent detection of an arrival of said wave packet at a second one of two transducers;
- (i) detecting an arrival time of said wave packet using the method of the first aspect, wherein said sampling frequency is said clock operating frequency and is provided by said clock, and said digital signal data including said measurement portion is stored in a memory having an address determination for consecutive samples of said digital signal data being altered by said clock such that each address in said memory corresponds to an identifiable time which is identifiable after generation of said acoustic wave packet.

Generally, a plurality of the acoustic wave packets are transmitted and, excepting the first transmission, the transmission of all subsequent acoustic wave packets are synchronized to the reception of the immediately preceding acoustic wave packet. Typically, upon transmission of a particular acoustic wave packet a delay time is counted and the transmission of the next acoustic wave packet is instituted after the delay time has elapsed and when the measurement portion corresponding to the particular acoustic wave packet next crosses the signal level value.

In an alternative configuration an acoustic wave packet is transmitted simultaneously from each of the transducers for reception by the other of the transducers and the propagation time of each of the acoustic wave packets is thus determined. Typically, in such an arrangement step (a) further comprises compensating for phase differences between the digital signal data converted from analogue signals output from respective ones of the transducers.

In accordance with a third aspect of the present invention there is disclosed a system for measuring a speed of a moving fluid, said system comprising:
  a measurement tube through which the fluid passes;
  two ultrasonic transducers disposed in said tube and configured for transmitting ultrasonic signals between each other;
  exciting means for exciting at least a first one of said transducers to generate an acoustic wave packet that propagates at a predetermined frequency along said tube toward a second one of said transducers;
  detecting means connected to at least said second one of said transducers for detecting the acoustic wave packet,
  converting means for converting at a sampling frequency an analogue signal output from at least said second one of said transducers to digital signal data,
  a first storage means for storing said digital signal data from said converting means;
  processor means connected to said first storage means for determining the speed of the fluid, said processor means comprising:
    first determining means for determining a measurement portion of said digital signal data, said measurement portion corresponding to a response of said second one of said transducers to said acoustic wave packet;
    second determining means for determining from said measurement portion a plurality of slopes $S_i$ for a corresponding plurality i of measurement segments of said response, each of said segments being about a signal level value V;
    third determining means for determining from at least selected ones of said slopes $S_i$, an arrival time t of said acoustic wave packet.

Typically, the system further comprises fourth determining means for determining, for selected ones of said segments, a corresponding measurement time $A_i$ indicative of a time at which said response intercepts the signal level value, wherein the third determining means determines said arrival time t from said corresponding measurement times $A_i$.

Preferably, the system further comprises a second storage means connected to said processor means for storing a reference signal, said processor means including fifth determining means arranged to match parts of said reference signal with the measurement portion to determine a measurement position of each of the segments in the measurement portion, wherein said measurement times $A_i$ are determined using a corresponding one of said measurement positions.

Advantageously, the system further comprises adjusting means, coupled to at least said second one of said transducers, for adjusting the magnitude of said analogue signal from at least said second on of said transducers to fall between certain limits, said certain limits preferably being equally displaced either side of the signal level value, said signal level value preferably being an average of an output of the second transducer before said measurement portion.

Typically, in any of the aspects, the sampling frequency is between 500 kHz and 10 GHz. Preferably the sampling frequency is 10 MHz.

Generally, in any of the aspects, the predetermined frequency is between 20 kHz and 5 MHz. Most preferably the predetermined frequency is 125 kHz.

In accordance with one broad aspect of the present invention, there is disclosed a method of detecting the arrival time at a transducer of an acoustic wave packet transmitted at a predetermined frequency, the method veing characterized by compensating for deviations from the predetermined frequency of the acoustic wave packet as detected by the transducer.

BRIEF DESCRIPTION OF THE DRAWINGS

A number of preferred embodiments of the present invention will now be described with reference to the drawings in which.

BEST AND OTHER MODES FOR PERFORMING THE INVENTION

Figure 1:
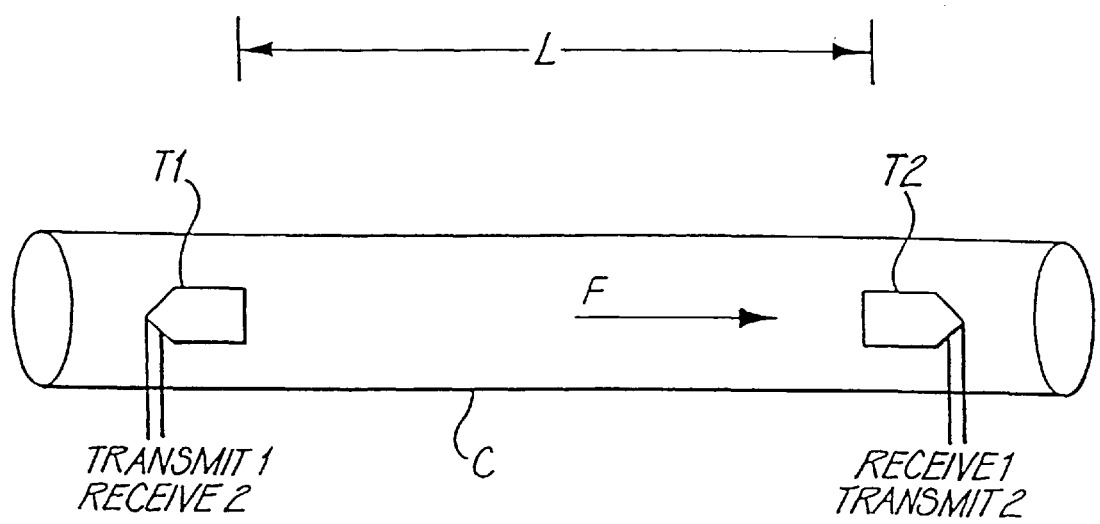
FIG. 1 depicts the arrangement of two ultrasonic transducers disposed in the field of flow of a fluid, the ultrasonic transmissions of which are used to measure the flow velocity of the fluid according to the described embodiment.
Figure 2:
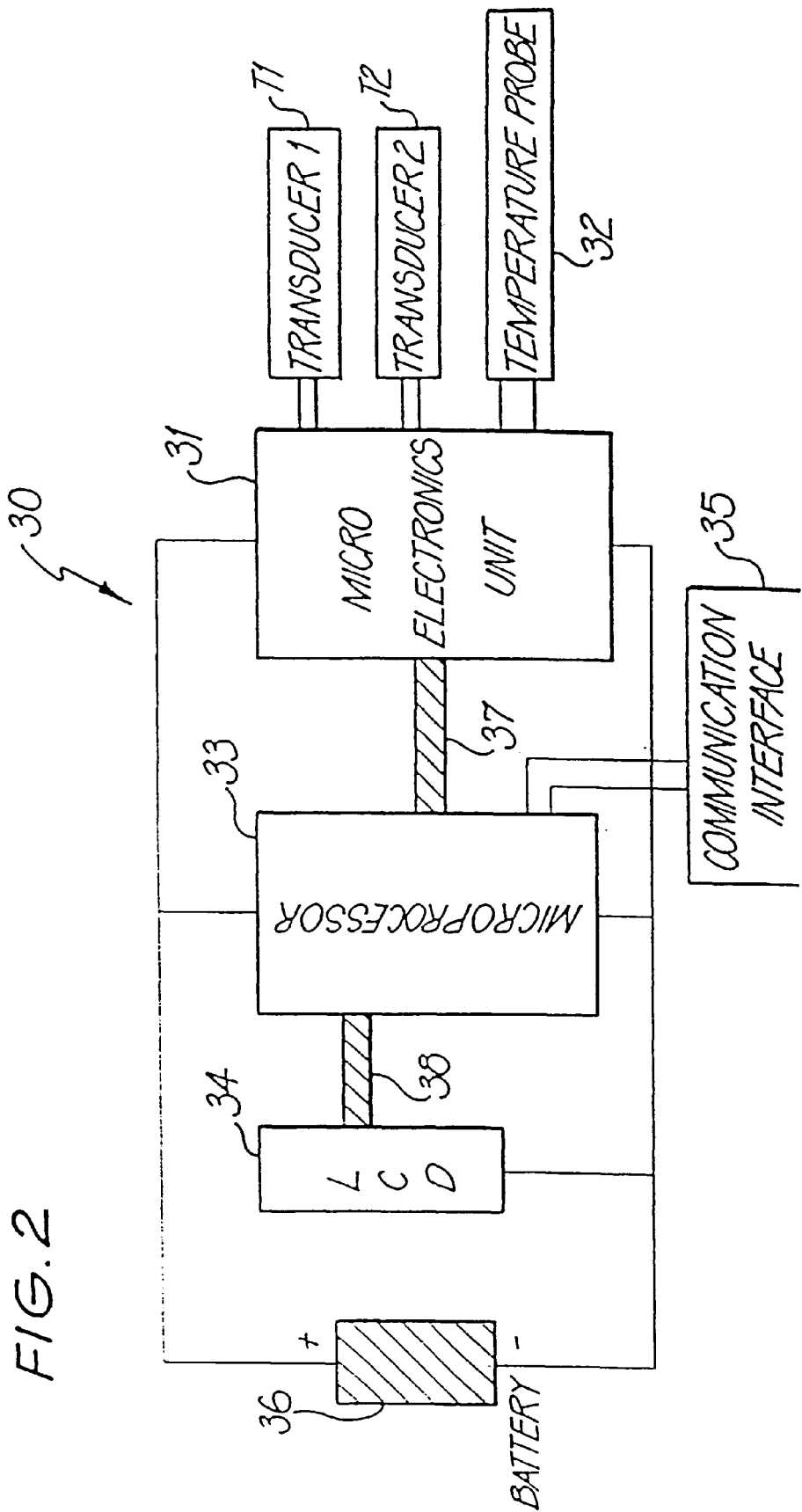
FIG. 2 is a schematic block diagram representation of the functional units of the preferred embodiment.

FIG. 1 shows two ultrasonic transducers, T1 and T2, each of which can act as either a transmitter or a receiver, disposed facing each other along the axis of a cylindrical measurement chamber C and separate by a length L through which a fluid F, whose flow velocity v is to be measured, is flowing. The measurement chamber C is part of an overall measurement circuit 30 represented schematically in FIG. 2.

The measurement system 30 includes a controlling microprocessor 33 linked via a main bus 37 to a microelectronics unit 31 which contains specialist electronics that interconnect to the transducers T1 and T2, and to a temperature probe 32, positionable within the measurement chamber C to determine the temperature of the fluid F whose flow is being measured. A battery unit 36 supplies electrical energy to the microprocessor 33 and microelectronics unit 31, the latter of the two generating signals for and receiving signals from the transducers T1 and T2, and determining individual times of flight (propagation) of ultrasonic wave packets. The microprocessor 33 provides for averaging multiple times of flight and calculation of flow rate for display on a liquid crystal display (LCD) 34 via a display bus 38. A communications interface 35 is provided to transfer the flow rate and other data to a suitable data acquisition system (not illustrated) but known in the art, for example from the aforementioned International Publication No. WO 93/00569.

The value for the fluid flow velocity from the measured time of flight of an ultrasonic signal with, and against, the fluid flow, can be derived using the expression:

$$v_f = 0.5L(1/T_d - 1/T_u)$$

where:

$v_f$=Velocity of fluid in the measurement tube,

L=Length of measurement tube, $T_d$=Time-of-flight of acoustic pulse downstream, and $T_u$=Time-of-flight of acoustic pulse upstream.

Accurate measurement of the time-of-flight (or propagation) is therefore the central task in determining fluid velocity by the preferred embodiment. In the preferred embodiment, a short acoustic pulse train is transmitted from an ultrasonic transducer at one end of the measurement tube, which is detected (received) by a similar transducer at the other end. After passing through a variable-gain amplification chain, the received signal is digitized at a rate of 10 MHz by an A/D converter to give receive data. The receive data is then input into 4 Kbyte of fast random-access-memory (RAM). To achieve the required accuracy, the time of arrival of the acoustic signal must be determined to within about 1 ns, ie. 1% of the time between digitization samples. It is therefore desirable to interpolate between points on the digitized signal. This is done by performing linear regressions on the receive data in a band around the quiescent signal level, and using the intercepts obtained thereby, together with knowledge of the received signal frequency, to make a number of separate calculations of the time of arrival. A weighted average of these results forms the final estimate of acoustic transit time. To reduce the uncertainty of the measurement, in the preferred embodiments a number of specific features are included.

Firstly, the A/D converter used is an 8-bit device which only operates over a window covering approximately the middle one-third of the received signal, so that the effective precision of the conversion is increased from 8 bits to $(8+\log_2(3))$ bits, ie. about 9.6 bits. Such an arrangement is preferred because data points outside this middle range of a sinusoid carry more amplitude information than timing information, and are thus of little use to the timing measurement.

Secondly, the pulse generator for the transmitting transducer is linked directly to the 10 MHz clock. All crystal clocks suffer jitter to some extent, and if a separate pulse oscillator were to be triggered from a single clock transition, the full uncertainty of the jitter would be introduced into the measurement. By tying each transition of the acoustic pulse generator to an edge of the 10 MHz clock signal, the effect of clock jitter is substantially averaged out.

Thirdly, because the transducers are resonant devices, albeit weakly resonant, the frequency of the received signal may not be the same as that of the drive signal. Under the conditions of the presently described application, if the received frequency differs from the transmitted frequency by say 10%, and no correction is made, an over-or under-estimate of 0.35% will occur over the entire flow range. The resonant frequency of many ultrasonic transducers changes noticeably with temperature, so in calculating the arrival time of the beginning of the received signal, the period of oscillation is not assumed to be equal to the transmitted frequency, but rather is derived from the received waveform data.

Figure 7:
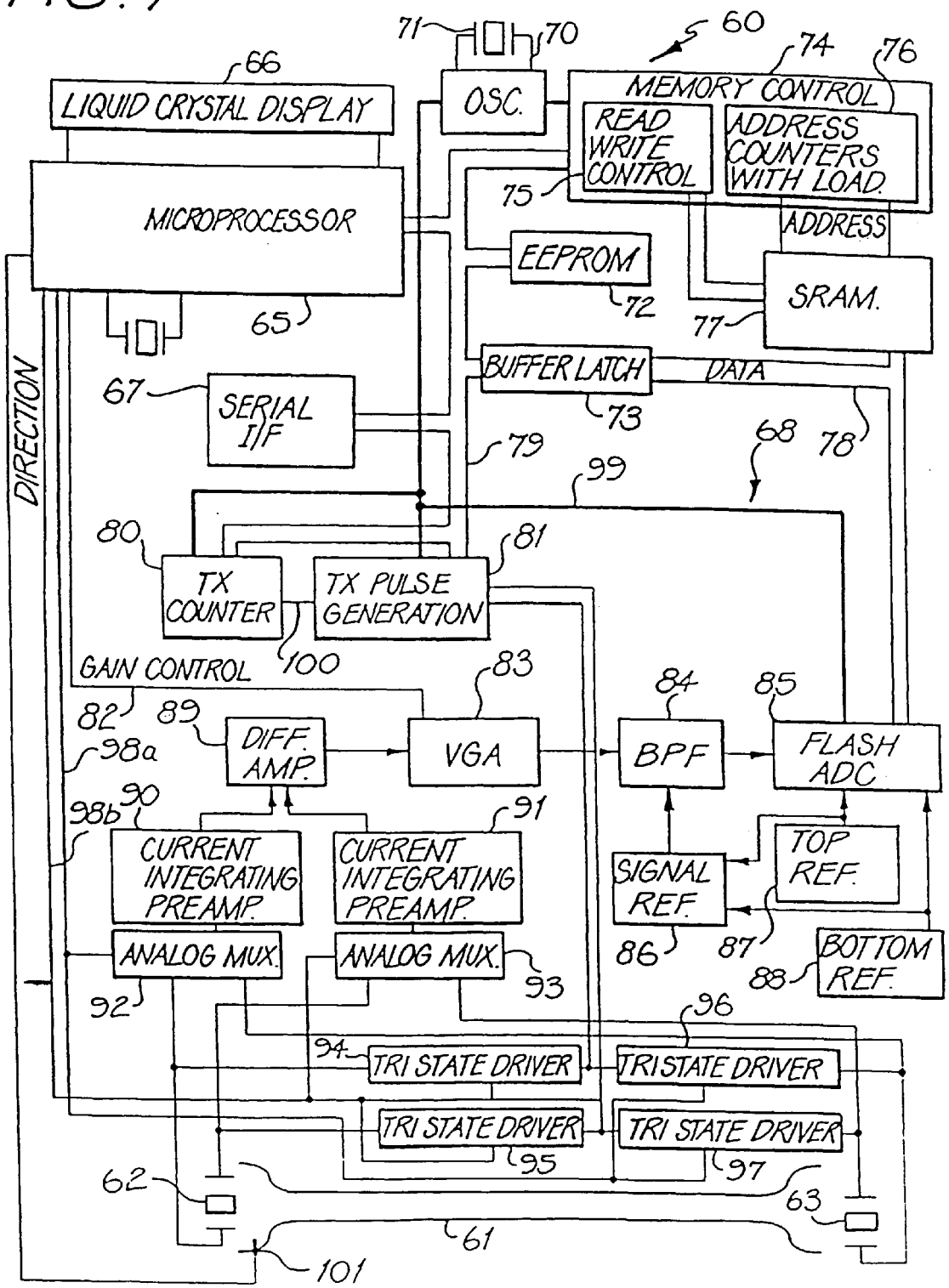
FIG. 7 is a schematic block diagram of the electronics for a first embodiment.

One specific embodiment which realizes the advantages of this method in measuring the flow velocity of a gas, integrating this to measure the volumetric flow and displaying that result, is depicted in FIG. 7.

In FIG. 7, a measurement system 60 is shown which includes a pipe section 61 adapted for the measurement of fluid flow, two transducers 62 and 63 positioned within the section 61 and separated by a predetermined distance for transmitting and receiving ultrasonic signals, a battery unit (not illustrated for the purposes of clarity, but whose connection would be well understood in the art), a microprocessor 65, a liquid crystal display (LCD) 66, a serial communications interface 67, measurement electronics 68 for driving and receiving from the transducers and timing the ultrasonic flight time including a variable gain amplifier means 83 for altering the amplitude of the received signal, and a probe 101 for measuring the temperature within the pipe 61.

The microprocessor 65 is preferably a 16-bit device constructed using a "von-Neumann" architecture and which includes 4 Kbytes of read-only memory (ROM) and 256 bytes internal RAM. Also contained in the microprocessor 65 is a universal asynchronous receiver-transmitter (UART), an analogue-to-digital converter (hereinafter $\mu$ADC) with a current source, a timer with interrupt useable as an event counter and a watchdog timer crystal oscillator which is a time-of-day device providing a 32.768 kHz signal. The latter is used as a real time clock and, when multiplied up by frequency-locked-loop techniques, is used as a clock for the microprocessor 65.

The LCD 66 incorporates a driver which interconnects to the microprocessor 65 in a known manner.

An electronically-erasable programmable read-only memory (EEPROM) 72 connects to a system bus 79, which is controlled by the microprocessor 65, and provides calibration information for the measurement system 60.

The serial interface 67 enables the system 60 to be coupled to external devices through either an optical link, or some proprietary communications bus such as M-bus.

The battery unit preferably comprises a single 3.5 Volt D-size lithium cell.

A controllable crystal oscillator 70 and crystal 71 provide, via a clock bus 99, a high-frequency clock, at a preferred frequency of 10 MHz, to a high-speed (flash-type) analogue-to-digital converter 85 (hereinafter flash ADC) and memory control logic 74 comprising an address counter 76 and read/write control logic 75. The oscillator 70 is started prior to a flow measurement and allowed time to settle. When not required it is shut down to conserve power.

A transmit clock generator (transmit counter) 80 connects to the buses 79 and 99 and divides the high-frequency clock to provide a clock signal 100 for a transmit pulse sequence generator 81. The transmit frequency can be varied under control of the microprocessor 65 by changing the number of high-frequency clock cycles comprising each transmit clock pulse.

The transmit pulse sequence generator 81 is formed by a shift register that holds a bit pattern which, when clocked out, forms the transmit pulse sequence. The bit pattern is initialized by the microprocessor 65 via the bus 79 to which the sequence generator 81 also connects. More complex waveforms can be generated by having more bits in the shift register and clocking at a higher rate. The edges of the outgoing signal are synchronized by the high-frequency clock. A quantization error is avoided at the start of the transmit by having the transmit sequence clocked out by the same clock that controls the flash ADC 85.

The transmit pulse sequence is supplied to four tri-state drivers 94–97, arranged in two pairs 94 and 95, and, 96 and 97, each pair being connected to a different one of the transducers 62 and 63. The driver pair (eg. 94,95) connected to the transducer (62) which is going to transmit the ultrasonic signal, is enabled while the other pair (96,97) is placed in a high impedance state, allowing the transducer (63) connected to it to act as a receiver. The two outputs of a driver pair (94,95) are driven in anti-phase such that when one goes high the other goes low. This effectively applies twice the drive signal to the transducer (62).

Each of the ultrasonic transducers 62, 63 when receiving an acoustic signal appear to the remainder of the circuit as a differential current source.

Figure 8:
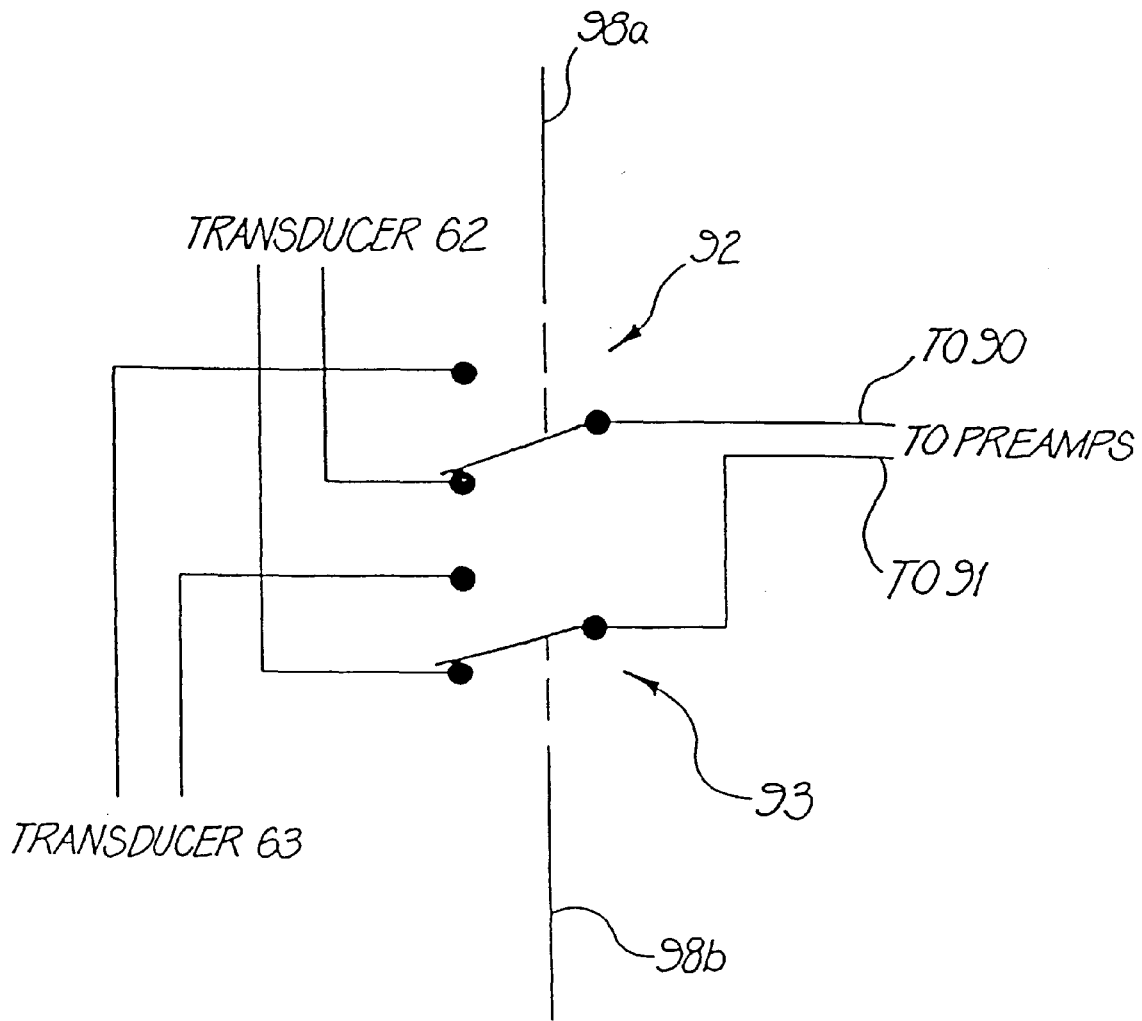
FIG. 8 is a schematic representation of the multiplexer unit of FIG. 7.

To enable reception of the acoustic signal, each of the transducers 62, 63 is connected to two analog multiplexers 92 and 93, which in turn connect to corresponding current integrating preamplifiers 90 and 91 respectively. A schematic representation of the analogue multiplexers 92 and 93 is given in FIG. 8. The multiplexers 92,93 switch to select one of two different ultrasonic input sources and connect it to the input of the preamplifier 90 or 91. The switches in the "off" state receive the transducer drive signal.

Each preamplifier 90 and 91 amplifies the difference between the two current signals coming from the corresponding transducers 62 and 63. This minimizes the effect of any interference which occurs on both inputs, by cancel out common mode signals. The preamplifiers 90,91 also supply a DC bias for the analogue multiplexers 91,93, and in turn, the corresponding transducer 62,63.

The gain of the preamplifiers 90,91 is high enough to ensure that the only significant noise source is in the front end amplifier thereof. The signal is low-pass filtered while in the preamplifier stage to reduce the amplitude of the noise. It is advantageous to maintain one pole at about 65 kHz.

A differential amplifier 89 sums the outputs of preamplifiers 90 and 91, and provides an input to a variable gain amplifier 83. The variable gain amplifier 83 is controlled by a gain control signal 82 output from the microprocessor 65 so as to give a signal amplification range of 0 dB to 60 dB. Such a range is required because the amplitude of the received signal varies with the direction of the ultrasonic signal, with respect to the flow velocity, the amount of flow, and the temperature.

The received signal output from the amplifier 83 is then filtered by a band pass filter 84 operating between 80 kHz and 170 kHz. The output of the filter 84 has a DC level centered about a reference voltage, which is generally about half the supply voltage provided by the battery unit 64.

Figure 5:
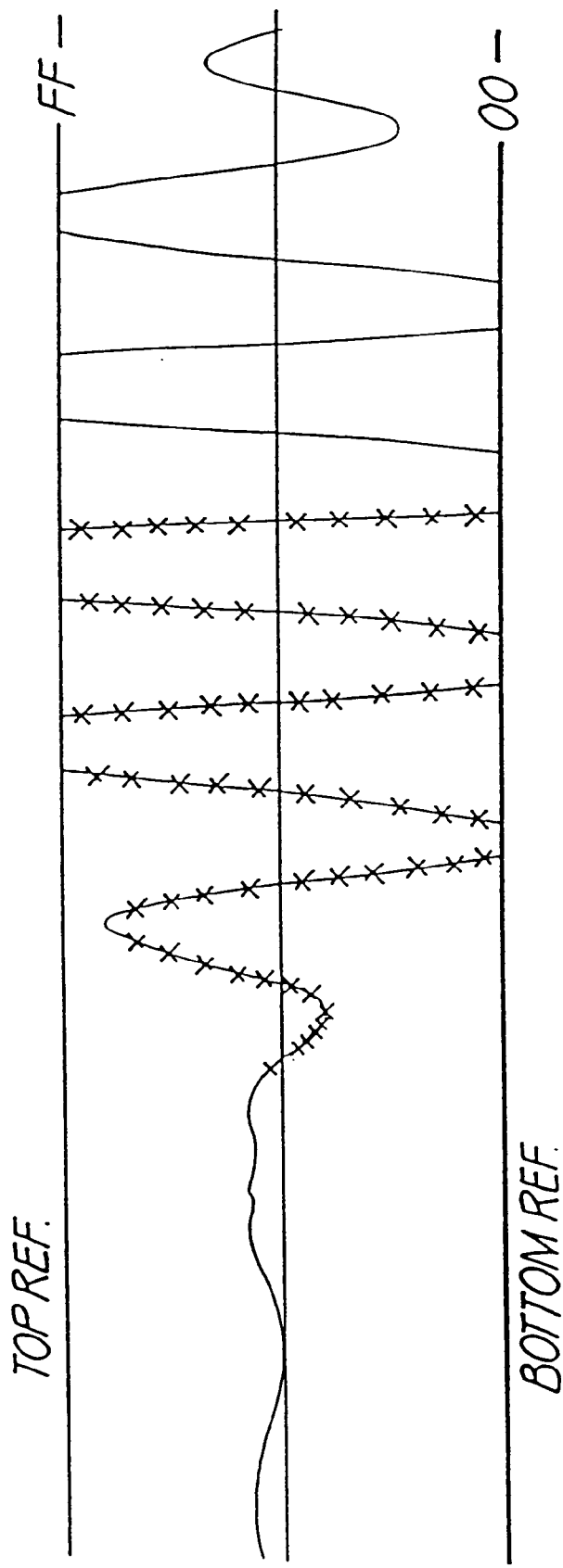
FIG. 5 illustrates the signal amplification and digitization process used in the described embodiments.

The bandpass filter 84 outputs to the flash ADC 85 which preferably has an 8-bit resolution. The flash ADC 85 converts the received signal to a digital signal at a sampling rate equal to the high-frequency clock generated by the oscillator 70 (ie. 10 MHz). Operation of the flash ADC 85 is depicted with respect to the waveform in FIG. 5. If the received signal lies between signal levels designated as Top Ref (ie. a Top Reference) and Bottom Ref (ie. a Bottom Reference), then the digital value is a measure of this position. If the signal exceeds Top Ref then the output is FF (Hex) and if it is less than Bottom Ref its output is 00 (Hex).

The Top Reference is a DC level generated by a circuit 87 which provides the upper reference voltage for the flash ADC 85. The Bottom Reference is a DC level generated by a circuit 88 which provides the lower reference voltage for the flash ADC 85. The distance between Top Reference and Bottom Reference is preferably set to 0.375 of the maximum height that the amplified received signal can attain without significant distortion. The position of these voltages must be such that when the signal is at the maximum height it is centered, so that the amplifiers 83, 87, 90 and 91 do not clip or distort the peaks of the waveform. It is important to avoid any clipping of the waveform by the amplifiers 83, 87, 90 and 91 because it will introduce a DC offset into the processed received signal.

A signal reference 86 is a DC level generated from Top Ref and Bottom Ref signal levels and lies midway between those two voltage levels. The signal reference 86 is used as the DC bias for the output of the bandpass filter 84 as discussed above.

The data samples taken by the flash ADC 85 are output on a signal data bus 78 to which a high speed static memory (SRAM 77), which preferably has a capacity of 32 kbits, and a buffer latch 73 connect, the former providing for waveform storage of part of the received signal.

A Memory Read/Write Control unit 75 produces read and write pulses required by the high-speed memory 77. An Address counter 76 within the control unit 75 connects to the high-speed memory 77 and includes a 12-bit counter with associated logic.

The waveform data from the flash ADC 85 is stored in the high-speed memory 77 under control of the address counter 76 and memory read/write control logic 75. The memory 77 has two modes of operation.

In a "Measurement mode", data is transferred from the flash ADC 85 to the static memory 77 in real-time. One byte is transferred for every cycle of the high-frequency clock, corresponding to a data transfer rate of 10 Mbytes per second. The address counter 76 provides the address to the memory 77. In this mode, the address counter 76 is automatically incremented for each transaction. This means that the address has a one-to-one correspondence to the time the waveform is sampled after the transmission of the ultrasonic signal.

In a "Processing mode", retrieval and processing of data by the microprocessor 65 is performed. Data can be transferred from or to the microprocessor 65 from a selected address simply by loading the address counter 76 with the required address. The address counter 76 is incremented on each read or write of the high-speed memory 77 by the microprocessor 65. Data from a series of addresses can, therefore, be read or written to another address by loading the address counters 76 with the first address, then reading out or writing the bytes in sequence. Data transfer between the memory 77 and the microprocessor 65 is via the buffer latch 73. The microprocessor 65 reads from or writes to the latch 73 rather than directly to from or to the memory 77. This allows the memory 77 to remain in a low-power mode most of the time while the slower microprocessor 65 is reading or writing data.

Figure 13:
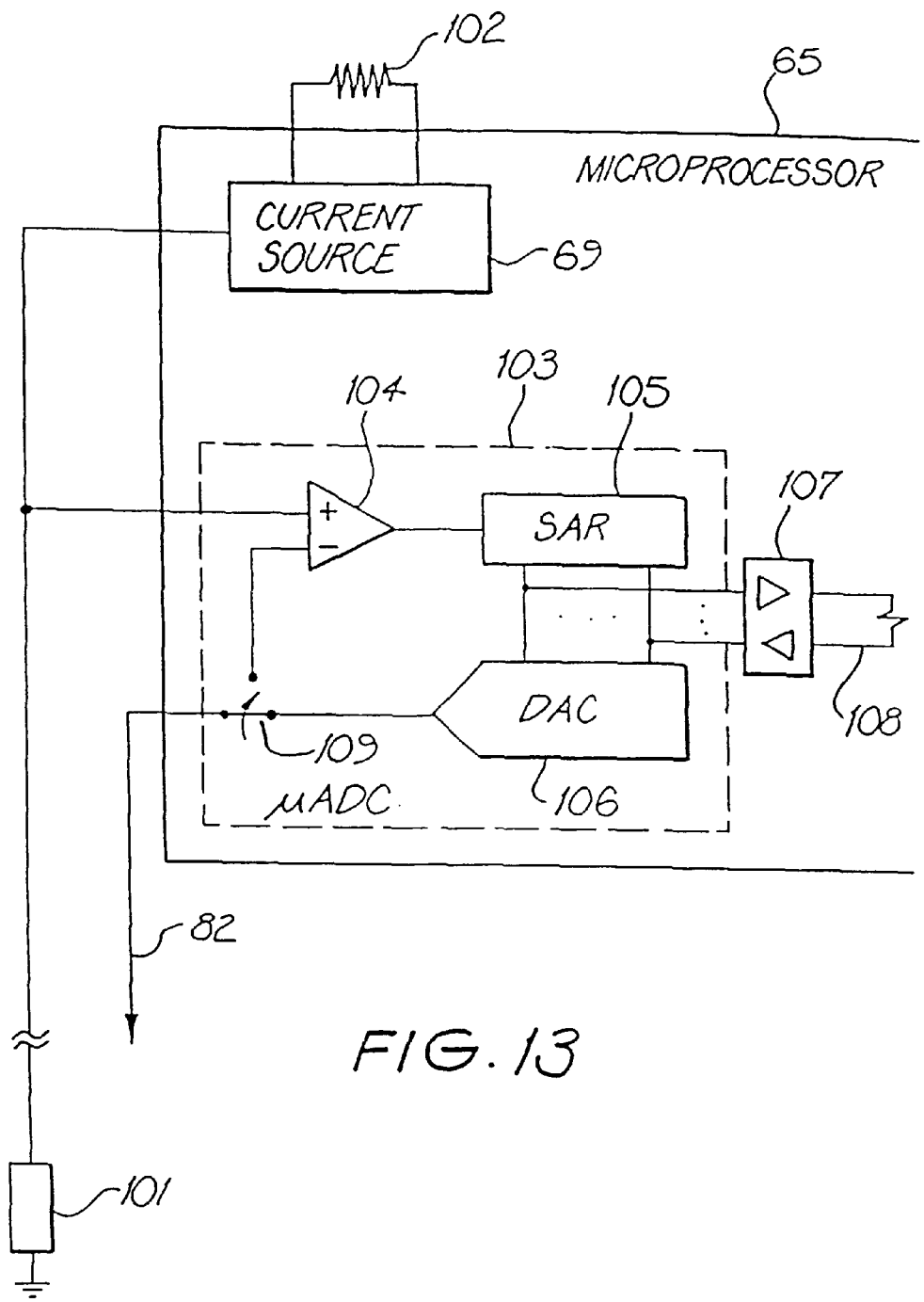
FIG. 13 is a schematic representation of part of the microprocessor used in the described embodiment.

With reference to FIG. 13, which illustrates only part of the architecture of the microprocessor 65, fluid temperature is measured by means of a microprocessor current source 69 driving a resistive temperature sensor 101. The magnitude of the current source 69 is programmed by an external resistor 102. The input from the resistive temperature sensor 101 can then be referenced back to the supply voltage, provided by the battery unit, in the same manner as the current source 69, thereby allowing a ratiometric measurement to take place.

As mentioned above, the microprocessor 65 includes a $\mu$ADC 103 which is formed from a comparator 104, which receives the analog input, a successive approximation register 105, and a digital-to-analog converter (DAC) 106, a configuration well known in the art. A bidirectional buffer 107 permits coupling of converted data onto internal buses 108 of the microprocessor 65.

For the temperature measurement, the voltage is taken directly from the sensor 101 and applied to an analogue input of the $\mu$ADC 103. The sensor 101 is a resistive temperature sensor supplied by the current source 69. The magnitude of the current source 69 is a function of the supply voltage and is programmed by the external resistor 102, such that:

$$I_{source}=(0.25.V_{dd})/R_{ext}.$$

The input from the resistive temperature sensor 101 is, thus, referenced back to the supply voltage in the same manner as the current source 69:

$$V_{in}=(0.25.V_{dd}).(R_{sens}/R_{ext}), \qquad (1)$$

where $R_{sens}$ is the sensor 101, a temperature varying resistive element.

The $\mu$ADC 103 output is a linear function of the supply voltage:

$$V_{DAC}=(a+K.N).V_{dd} \qquad (2)$$

where a and K are known constants and N is the multiplier of the DAC 106.

The comparator 104 compares the output of the DAC 106 with the voltage from the sensor 101. This determines the N value for which $V_{dac}=V_{in}$.

The measured value N can then be output via the buffer 107 for temperature compensation calculations. The measurement of $R_{sens}$ is ratiometric. Combining equations (1) and (2) above removes the supply voltage from the calculation, to give:

$$(0.25.V_{dd}).(R_{sens}/R_{ext})=(a+K.N).V_{dd}$$
$$R_{sens}=(a+K.N).4.R_{ext}$$

Also, the buffer 107 can be used for automatic gain control whereby the microprocessor 65 determines the appropriate value, which is then input to the DAC 106 via the buffer 107. The DAC 106 then performs a direct conversion-to provide the gain control voltage 82. A switch 109 is provided to isolate gain control functions from temperature functions. In view of temperature being relatively stable over more than one sample, which requires gain control determination, temperature functions can be performed when flow measurements are idle.

In an alternative configuration, a parallel or serial (eg. I²C) output of the microprocessor 65 can drive an external DAC (not illustrated) which can directly supply the gain control voltage 82.

Conservation of power is important for long battery life. Current consumption is reduced by maintaining the electronics in a low power mode whenever possible. The address counter 76 can be used to help achieve such conservation if it doubles as a wake-up delay counter.

If the address counter 76 is initialized to a value other than zero, then the carry from the counter 76 can be used as a wake-up interrupt to the microprocessor 65. The microprocessor 65 wakes up and turns on the signal path electronics consisting of preamplifiers 90,91, differential amplifier 89, variable gain amplifier 83, bandpass filter 84, enables the memory 77 and the flash ADC 85. The microprocessor 65 then returns to a low power mode while the data is being collected.

Having described the structure of the measurement system 60, the measurement of the time of flight will now be described in detail with reference to FIG. 4, which depicts schematically the flow of information and a number of method steps resulting from the embodiment of FIG. 7.

At Point (1), the 10 MHz clock signal, generated by the oscillator 70, provides (timing reference information. At Point (2), to cause the start of a measurement, the 10 MHz clock is used, by the counter 80 and generator 81 to generate a train of three square-wave pulses of nominally equal mark/space duration, which are fed to the transmitting transducer in the measurement tube 61 for generation of the ultrasonic signal. In the present example, the ultrasonic signal preferably has a frequency of approximately 125 kHz, so each cycle of the ultrasonic signal has a duration of 80 cycles of the 10 MHz clock. Use of the 10 MHz clock to generate the transmitted signal ensures that the timing of the transmitted waveform is accurately known. At Point (3), starting on the same clock transition as the transmitted signal, the address counter 76 is enabled. Thus, a synchronous counter is used to generate sequential addresses for the memory 77 at the rate of one address per 100 ns.

Figure 4:
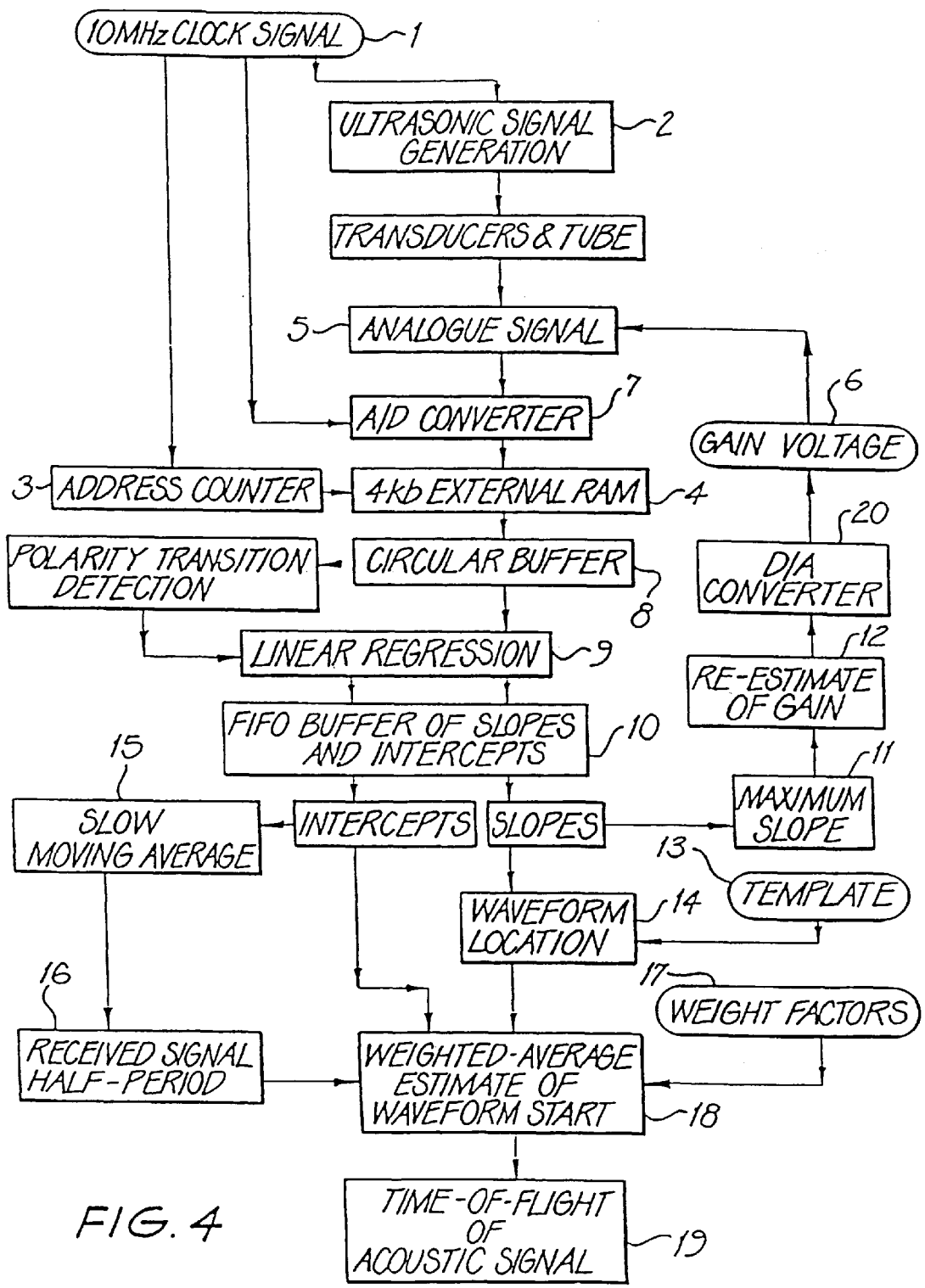
FIG. 4 is an information flow diagram for the preferred detection method.

As indicated at Point (7) in FIG. 4 and as discussed above, the output of the receive transducer, which includes the desired analogue waveform, is passed to the flash ADC 85 in which the conversions to digital form are triggered by transitions of the 10 MHz clock. The memory 77 thus receives its address control information from the address counter 76 and its data from the flash ADC 85, at the rate of one byte every 100 ns. The static memory 77 can therefore store 409.6 μs of digitized waveform. Some time after the transmit is initiated, and while the acoustic wave packet is still propagating along the measuring tube 61, the flash ADC 85 and the static memory 77 are enabled and the incoming data, initially a DC level, begins to be written into the static memory 77.

To conserve power the microprocessor 65 does not activate the static memory 77 until shortly before the expected arrival time of the acoustic signal. If conditions have changed and the signal is missed, the measurement is repeated with more conservative settings. Because the required part of the received waveform is much shorter than 409.6 μs, the turnover of the address counter 76 and the subsequent overwriting of the static memory 77 do not constitute a disadvantage.

Figure 3:
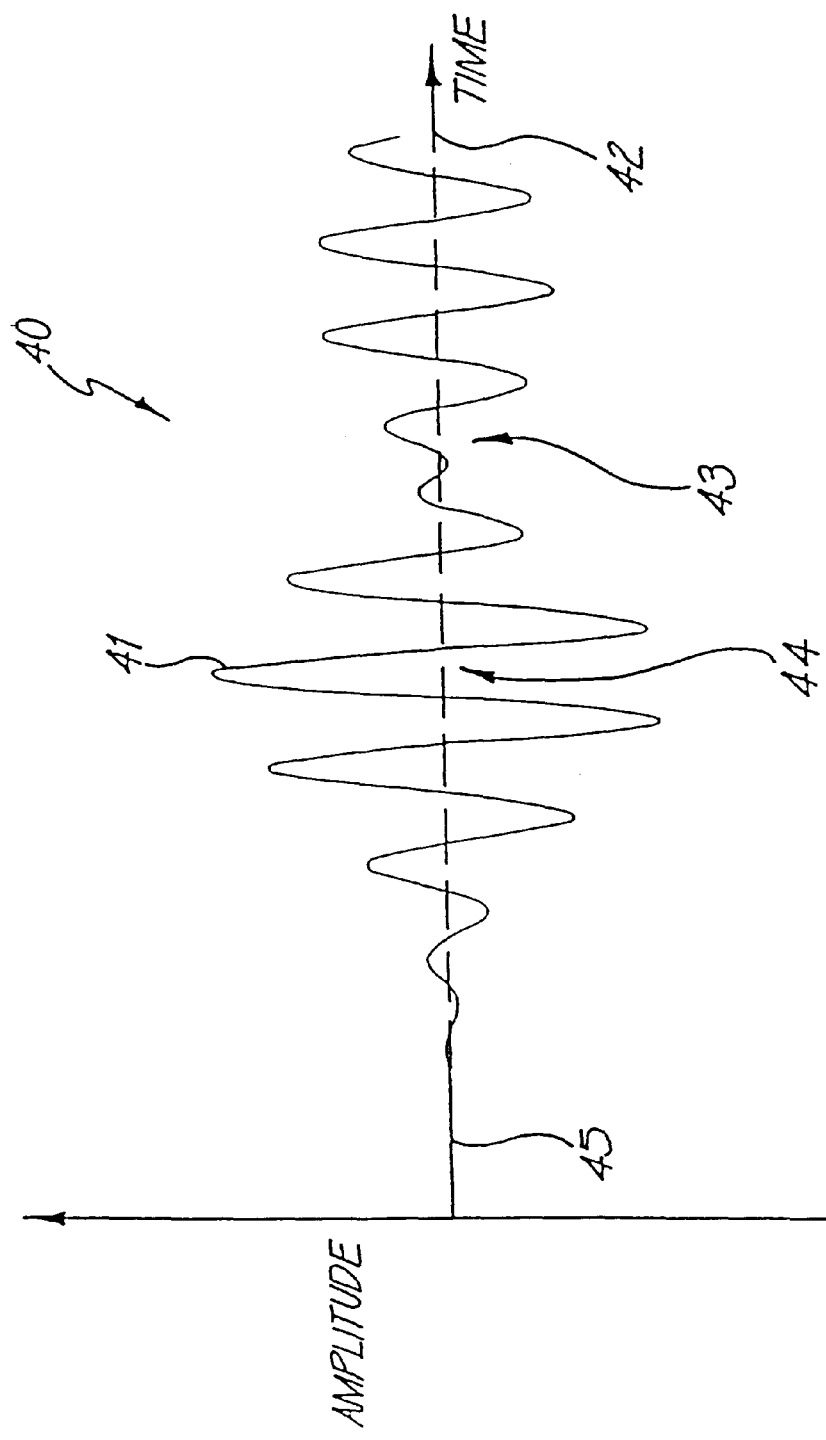
FIG. 3 depicts a typical ultrasonic waveform emitted by the ultrasonic transducers in FIG. 1.

The acoustic wave packet generated by the transmitting transducer travels along the measurement tube 61 and, after about 500 μs (in a measuring tube of length 175 mm and a speed of sound in natural gas reticulation systems of about 350 ms$^{-1}$), it is received by the receiving transducer, resulting in an analogue electrical signal, such as that shown in FIG. 3, being output from the receiving transducer. This signal is amplified in a number of stages, including one variable-gain stage, and the result is a signal, indicated at Point (5), of a known, standardized maximum amplitude. The gain-variation derivation is described below. The received acoustic wave packet is thus converted by the flash ADC 85 and stored in the static memory 77.

The microprocessor 65 stops the collection of data after the anticipated arrival time of the acoustic wave packet. The address counter 10 MHz clock is stopped and the 10 MHz clock to the flash ADC 85, which also functions as a write strobe to the static memory 77, is stopped. If the wave packet is missed then the measurement is repeated using a larger delay. The largest possible delay will correspond to the greatest possible retardation of the acoustic wave packet due to maximum fluid flow in a fluid of the highest density at the lowest temperature. The address counter 76 must be left running during the entire period from the initiation of the acoustic signal, to the time at which the microprocessor 65 disables the static memory 77, otherwise the position of a data byte in static memory 77, will not correspond to its time of arrival.

With a digitized representation of the received signal in the static memory 77, the microprocessor 65 and its associated software can then extract an estimate of the time of arrival of the acoustic signal. This is done by resetting the address counter 76, and switching its input from the 10 MHz clock to an output line of the microprocessor 65. A starting address is loaded into the address counter 76 and, by toggling the aforementioned microprocessor output line, the software can access subsequent bytes of the static memory 77 in sequence. The starting address is also loaded into a memory location in the microprocessor 65, and this "shadow" address value is incremented every time a data value is fetched from the static memory 77. To establish a quiescent signal level 45 (see FIG. 3), which precedes the arrival of the acoustic wave packet and which acts as a reference against which all other measurements are compared, a number of bytes, typically a power of 2 such as 128 or 256, are read from the static memory 77, summed and then averaged. The starting point for the address counter 76 must be low enough to allow for this determination of the quiescent signal level 45 from data received prior to the earliest anticipated arrival of the acoustic signal. The quiescent signal level 45 is thus representative of a no-received-signal (NRS) state of the measurement system 60. Also, the earliest anticipated arrival of the acoustic signal represents the commencement of a measurement portion of the stored digital signal data which is representative of an analogue signal output from the transducer indicating a response of the transducer to the acoustic wave packet. The measurement portion can extend for about 10 to 20 cycles of the received signal 40.

Once the quiescent signal level 45 has been determined, at Point (8) a software circular buffer is established by the microprocessor 65, having a length preferably corresponding to about 10 to 15% of one cycle of the acoustic signal. In the present example, where approximately 80 signal level samples are taken per cycle, a circular buffer size of 9 or preferably 10 bytes is suitable. The circular buffer technique permits data to be updated without a need to physically shift each entry along one place every time a new data item is entered. A buffer pointer, initially zero, points to the position in the circular buffer where the next entry is to be made. The pointer is incremented after each new entry is made, and when the value of the pointer exceeds the length of the circular buffer, the pointer is reset to zero. Thus, the pointer therefore "circulates" around the circular buffer, and once the circular buffer is filled, the pointer position at any time denotes the earliest entry in the circular buffer.

As each byte is read from static memory 77, and prior to being placed in the circular buffer, it is compared with the quiescent signal level 45 previously obtained, and the sign of the difference is compared with the value obtained from the previous byte. If the sign is the same as that calculated from the previous byte, the received signal has not crossed the quiescent signal level 45 and the current sign is stored for a future comparison. If the current sign differs from the previous sign, the received signal has crossed the quiescent signal level 45 and a limit is set that is equivalent to the current value of the aforementioned "shadow" address value, plus half the circular buffer size. Bytes are then read from the static memory 77 and put into the circular buffer until the shadow address value reaches the abovementioned limit, at which time the circular buffer contains a set of data points approximately equally disposed about the quiescent signal level 45. This represents a measurement segment individually manipulable for timing calculations.

At this stage, the contents of the circular buffer are used to perform a linear regression, indicated at Point (9) in FIG. 4, using the shadow address values corresponding to the time axis as the independent variable, and the data items in the circular buffer as the dependent variable. The linear regression comprises fitting the data pairs of voltage and time to a straight line using a least-squares technique. The regression line technique allows an estimate of the slope of the signal as it passes through the quiescent signal level 45, and also a time intercept value at that point time, which are determined for each measurement segment.

It is also possible to determine the half period of the waveform by the time interval between successive time intercept values and a waveform period by the time interval between alternate time intercept values. The value of the waveform period can thus be determined independently several times in the same waveform by taking a plurality of slopes. An average waveform period can be obtained by averaging these several values.

At Point (10) both the slope and intercept estimates are placed in a software First-In-First-Out (FIFO) buffer in the internal memory of the microprocessor 65, for later use. The computationally less-efficient FIFO buffer is used for this application because it is short, access to it is relatively simple, and it is updated at only one-fortieth the rate of the circular buffer.

Because, as seen in FIG. 3, the received waveform begins imperceptibly and builds up in amplitude over several cycles, it is not possible to directly determine its starting point. The start point must be inferred by locating a later position on the waveform (this position being used as a timing marker) and subtracting a time period corresponding to a known number of waveform cycles (which period in turn corresponds to the time elapsed from the start point of the wave packet) from that time. Typically, the position in the received signal 40 used as a timing marker in the timing of the transit of the wave packet along the tube 61 is a particular position on the waveform when the waveform passes through the quiescent signal level 45.

The intercepts determined from the linear regression at Point (9) thus serve as the timing markers if their absolute position can be determined within the waveform as a whole. To do this, the successive slope values within the FIFO buffer are compared with a stored set of slopes, referred to herein as a "template" and indicated at Point (13). This stored template is representative of the early part of the waveform, the shape of which may vary depending on the fluid flow rate, the properties of the fluid, and the temperature. A convenient size for this template is two to four elements, either of successive slope magnitudes of alternating sign, or alternate slope magnitudes of the same sign. Once the FIFO buffer of slopes has been filled, as each new slope value (including magnitude and sign) is inserted, selected elements are compared at Point (14) with the template to obtain a sum-of-squares of differences. This measure passes through a minimum when the template best matches the selected elements of the FIFO slopes buffer, and the process stops the matching process when the newly calculated sum-of-squares exceeds the previous value. At this stage, the intercepts have been correctly located within the waveform as a whole, based on the known template, with each intercept being nominally an integral number of half-periods from the start of the received signal. Thus, the matching of the slopes identifies a specific location or determines a measurement position for each slope within the received analog signal waveform, which is related to the commencement of the acoustic wave packet.

As indicated previously, the frequency of the received waveform may not match that of the drive signal, meaning that the drive waveform half-period may not be a good estimator for the half-period of the received waveform. This is particularly so where the signal is in the form of a short burst rather than a long wavetrain. Where the transducers 62 and 63 are made of a material such as PVDF, the resonant frequency of the coupled transducer/chamber/fluid combination, dominates the form of the received signal, and this resonant frequency can vary markedly (10 to 15%) with temperature and fluid properties. In addition, ageing effects can alter the piezo and elastic properties of the transducer, producing changes in the sensitivity and resonant frequency of the system. To cater for these changes, at Point (15) the received waveform period is modified over time to track changes by using a slow moving average of the received waveform period to compensate for deviations in the received signal due to changes in resonant frequency of the transducer over time kept for calculating the start point of the received signal. This average can be conveniently updated from differences in the intercept values of the FIFO buffer. A fraction of the difference between the freshly-calculated half-period and the old half-period value is added to the old value. If the fraction is, for example, 0.1, then after 20 repetitions the moving average will cover 88% of a step change in the half-period. Using smaller fractions of the difference will result in correspondingly slower responses in the moving average. This moving average is then used, at Point (16), as the received signal half-period.

Any intercept value in the FIFO buffer can be used to estimate the arrival time of the start of the waveform, by subtracting the appropriate number of waveform half-periods. To improve accuracy, more than one intercept can be used and the results can then be averaged. It is preferable to use a weighted average, where the weighting factors, indicated at Point (17), are derived from the slope corresponding to each intercept. The earlier intercepts are from a low-amplitude part of the received signal and are therefore relatively more affected by noise. Since the maximum slope of a sinusoid is proportional to its amplitude, the weighting factors are made proportional to the absolute slope at each intercept, averaged over temperature and fluid type. The weighted-average estimate of the waveform start, indicated at Point (18), is calculated by the microprocessor 65 in terms of sample number and fractions thereof since the last turn-over of the address counter 76. In the present instance, the address counter 76 would have "turned over" at 409.6 µs, so that the total time-of-flight of the acoustic signal, indicated at Point (19) is:

$$T_{d,u}=(409.6+\text{(weighted-average estimate of waveform start)}/10)\mu s.$$

At Point (6), a new gain estimate referred to above, is calculated from the maximum slope, derived at Point (11), encountered in the FIFO buffer of slopes. The magnitude of the maximum one of said slopes allows the amplitude of the peak 41 which is the maximum amplitude of the analogue signal to be estimated and hence, by adjustment of the gain of the amplifier 83, for the amplitude of the peak 41 to be held constant, or at least substantially constant within a predetermined range of magnitudes. Those limits are generally within ±5%, and preferably about ±2.5%. To allow the gain to stray beyond those limits can result in a mismatching of the template to the measured slopes, and therefore an inaccurate locating of those intercepts. If the gain of the variable-gain amplification stage produces a signal output directly proportional to its input control voltage, the gain re-estimate can be obtained from the equation:

$$G_n=(G_0)(\text{Target Max. Slope})/(S_n)$$

where:

$G_n$=Re-estimate of required gain, $G_0$=Previous gain value, and $S_n$=Most recent maximum slope.

However, depending on its design, the response of the gain control stage can better be approximated by an exponential or polynomial curve. In the present case, a cubic gives a satisfactory fit and, after linearization, the gain prediction equation can be expressed as:

$$G_n=G_0+C_1-C_2\cdot(\sqrt[3]{S_{n-C_3}})$$

where $C_1$, $C_2$ and $C_3$ are constants to fit the particular DAC 106 and amplifier combination, which in the present case are 59, 10.24 and 10 respectively. The result of such gain control is that the maximum slope, encountered in any one received wave packet, is maintained substantially constant for consecutively transmitted wave packets.

The re-estimated gain value $G_n$, indicated in Point (12) in FIG. 4, is a number between 0 and 255, which is fed to a DAC 106 indicated at Point (20), to produce the gain control voltage 82, indicated at Point (6) for the gain-control amplifier stage.

At start-up, there is no previous value of maximum slope from which to derive the new gain. Therefore, a typical value is stored in memory as the initial estimate from which to work.

Figure 6:
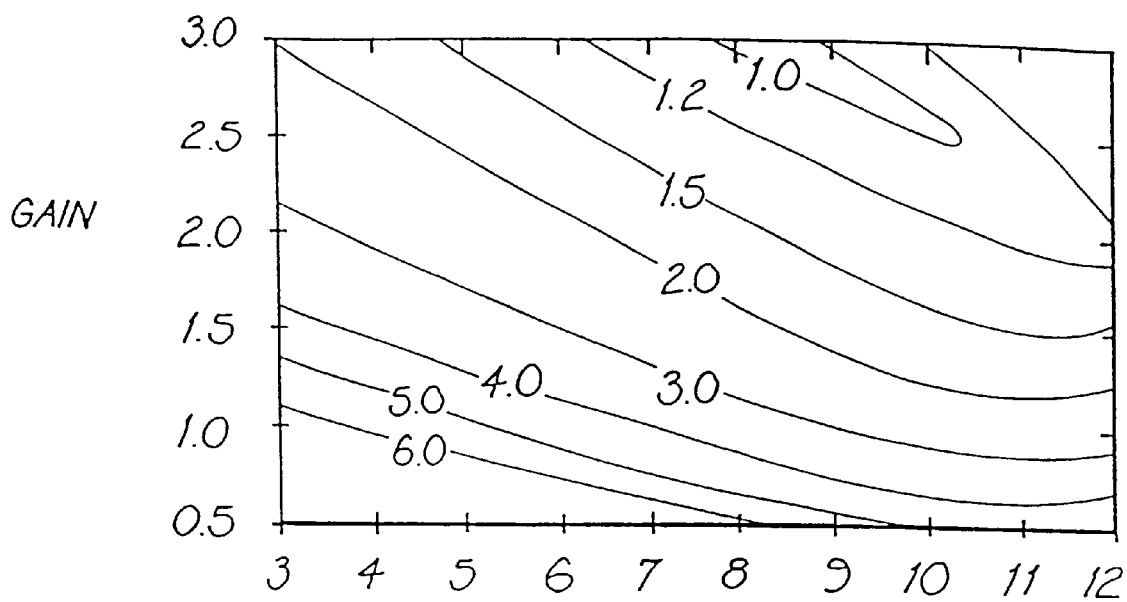
FIG. 6 illustrates the effect of increased gain on the digitized waveform.

There can be occasions when the required gain must change abruptly, for example when the temperature of the fluid changes rapidly. A particularly difficult condition occurs when the required gain falls very suddenly and the estimate derived from the previous measurement is much too large. FIG. 6 shows seven examples of the effect of increasing gain on the digitized waveform, where the gain increases by a factor of 1.5 from one plot to the next. In Plot 1 the gain is too low, whereas in Plot 7 the gain is too high. The target condition is similar to that shown in Plot 3 or Plot 4 with 9 or preferably 10 data points falling between the upper and lower saturation values. Such a condition maximizes the sensitivity of fit for the linear regression exercise which follows the gain-setting process.

A consequence of this, and an advantageous feature of the preferred embodiment, is that the procedure for gain-setting is extremely robust, being able to respond well to all of the conditions likely to be met under real conditions. The measured slope is a monotonically increasing function of the gain, so the gain-setting process is able to adjust the gain in either direction. In particular it is able to correct rapidly for a situation with excessively high gain.

One additional situation which must be avoided is that of zero gain. Because the arithmetic of the microprocessor 65 is fixed-point, a very small gain value can be truncated to zero. Because the new gain estimate is derived from the previous value by multiplication, the gain-setting process cannot recover from a zero gain situation. Therefore the process includes a zero check, wherein a non-zero value is substituted for the next gain if the calculated gain value is zero.

It will be apparent from the above described method that it is not necessary to measure the maximum or minimum values of the received signal and hence it is not necessary to have access to that part of the waveform. This allows the electronic gain to be set so that the peaks of the waveform lie above and below the voltage range of the flash ADC 85. By operating in such a state the middle part of the waveform can be digitised with an enhanced amplitude resolution. This enhances the accuracy of the entire process of determining when the signal has passed through the NRS state.

Also, as long as the absolute position of the timing markers in the waveform has been determined, it is possible to use any of the occasions when the signal passes through the NRS state as timing markers. An average can be then taken of the estimated time of arrival of the signal based on a number of those markers. The average is advantageously weighted according to the slope of the waveform at that time, since the accuracy of the estimation of the time when the signal passes through the NRS state is better when the slope of the signal is highest.

Using the method developed, it is possible to perform all the needed processing of the data in a single scan of the data. This has the advantage of requiring less time and less energy for its execution than for methods that need multiple passes of the data through the processor.

The method also makes it possible to take account of the ageing of the transducers, or other processes that may change the shape of the waveform, by slowly updating the template against which the waveform is compared. This is possible because there is a large degree of difference permitted while still obtaining a correct determination of the absolute position in the waveform.

Further, by using a clocked shift register to provide the transmit pulses, the edge jitter on the quartz clock pulses can be reduced and hence an increase in the accuracy of timing can be obtained.

In a second embodiment of the invention, the method and arrangement described above is combined with the so-called "ring-around" method described in the above mentioned International Patent Publication No. WO 93/00569. In the configuration of measuring tube and transducers described in WO 93/00569, an ultrasonic pulse is required to be timed to an accuracy of 1.56 ns to attain the required flow accuracy. If a single zero crossing were used for this timing, a clock running at 640 MHz would be required. The same accuracy can be achieved at a much lower power consumption by timing at 10 MHz and sending the signal down the tube 64 times.

In such a scheme implemented using the teachings of the present invention, the received pulse can be examined each time to identify the crossing of the quiescent signal level 45 on which to retransmit the next pulse. An ultrasonic burst is sampled digitally and a delay determined which acts to inhibit retransmission until the arrival of a nominated crossing of the ultrasonic pulse. The transit time of the ultrasonic bursts is then determined more accurately by transmitting a sequence of ultrasonic bursts, each burst after the first being transmitted upon reception of the immediately preceding burst. The delay is initialized at each transmit and retransmit which occurs on a crossing of the quiescent signal level 45 of the received ultrasonic pulse only after this delay has expired.

This method has the advantage that the delay to the crossing of the quiescent signal level 45 is determined with a single ultrasonic burst so that higher order acoustic modes from previous transmissions are not present. Further, the method requires less energy to run a slower counter and transmit the ultrasonic signal several times. The identification of a specific crossing is better performed from a timed delay. Acoustic modes remaining in the tube from previous transmissions will modulate the received ultrasonic signal and cause its envelope to vary in shape. The retransmit crossing is little affected by residual modes because the energy of the signal is relatively high at this position.

A crossing of quiescent signal level 45 by the received ultrasonic burst is selected as the "retransmit crossing". This crossing should be one which arrives before any significant secondary modes, but also arrive far enough into the waveform to be little affected by noise. A suitable crossing for the measuring tube described here has been found to occur two and one half cycles into the waveform.

Figure 9:
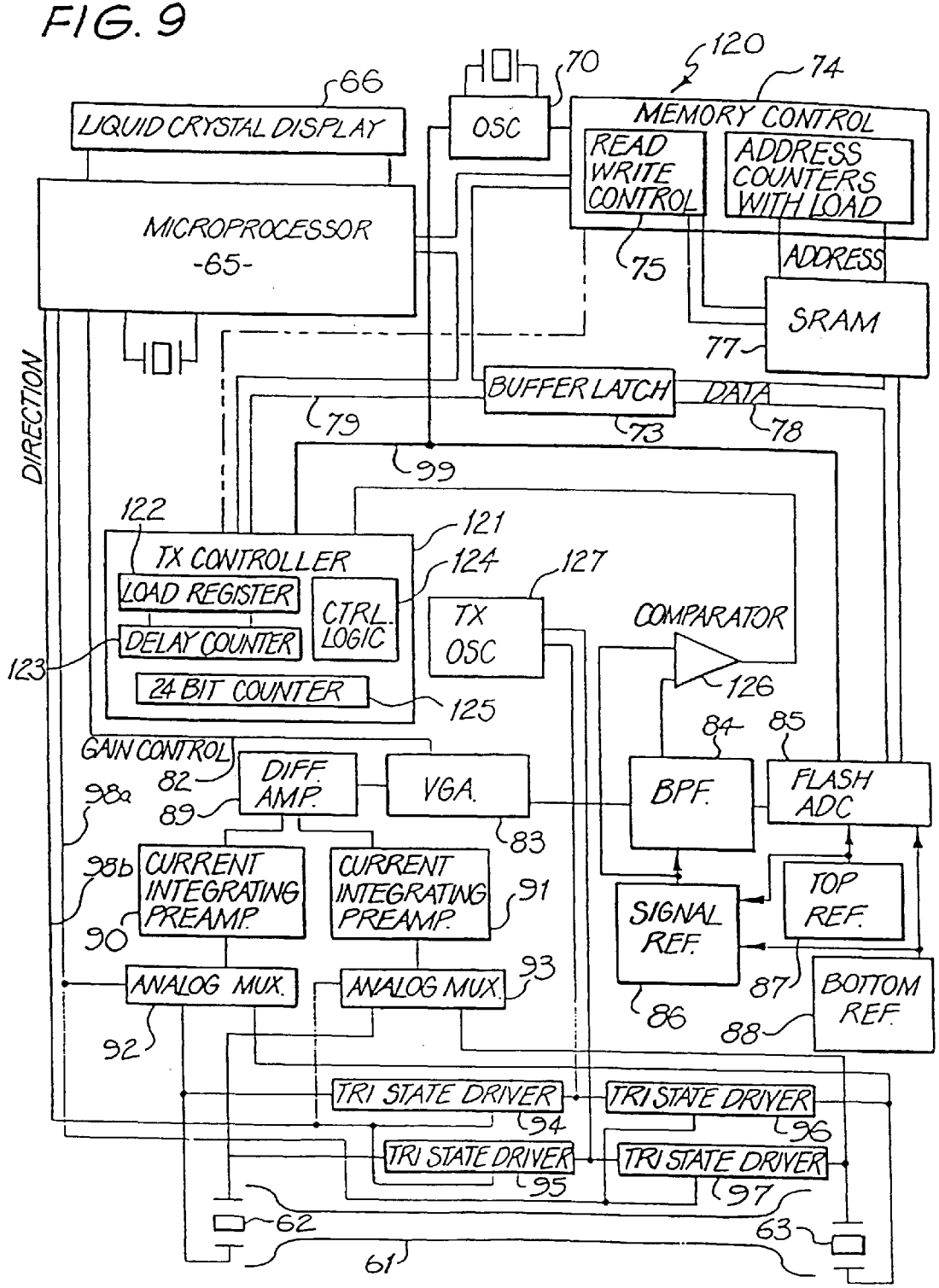
FIG. 9 is a schematic block diagram of a second embodiment which utilizes the so-called "ring-around" method.

A measurement system 120 which realises the advantages of such a measurement scheme is depicted in FIG. 9, where components having like structure and function to those in FIG. 7 are provided with corresponding reference numbers, some other common components being omitted for the purpose of clarity, which will be understood by those skilled in the art.

During a scan, a transmit oscillator 127 is enabled on a crossing of quiescent signal level 45 by the received signal 40. The oscillator 127 replaces the pulse generator 81 of FIG. 7 and is asynchronous to a scan timing counter clock 125, and outputs to the tri-state drivers 94–97.

The scan timing counter clock 125 is provided in a transmit controller 121, which replaces the transmit counter of FIG. 7, and comprises a 24-bit resettable counter used for measuring the cumulative time that it takes to send pulses from one transducer to the other. The counter 125 is reset at the start of the first transmitted pulse in a scan and counting is disabled after reception of the last received pulse in a scan.

Control logic 124 is provided in the controller 121 to integrate the functions of the transmit controller 121.

The controller 121 also includes a load register 122 which receives a delay value from the microprocessor 65 via the bus 79. That value is then placed in a delay counter 123 which is used to time the delay before retransmission is enabled. This counter 123 is loaded each time there is an ultrasonic transmission.

Flow measurements are specifically performed in the following stages:

1. The transmission direction is selected using direction lines 98a and 98b.
2. The receiver gain is adjusted, under the control of the microprocessor 65, until the slope of the received ultrasonic bursts transitions are within an established specification.
3. The crossing detection delay is initialized. In this first stage, the waveform is sampled digitally, and the time from the ultrasonic transmit to the arrival at the detector of the crossing that has been selected to initiate a retransmit is determined. A delay value less than this by half a period of the ultrasonic burst, is loaded into the delay counter 123 by the microprocessor 65.
4. In this stage of the measurement, the transit time of the ultrasonic pulses is determined more accurately by transmitting a sequence of ultrasonic bursts, each burst after the first being transmitted upon reception of the immediately preceding burst. The generation, emission and detection of a single ultrasound burst will henceforth be referred to as a "ringaround", also sometimes known as a "singaround". A single scan of the fluid flow consists of two sets of a predetermined number of ringarounds, first in one direction and then in the other. A sequence can include any number of ringarounds, but advantageously will involve 64.

The delay counter 123 and the timing counter 125 are started when the first ultrasonic burst is sent. The leading edge of this first ultrasonic burst is synchronized to the timing clock 70. The start of the second and subsequent ultrasonic bursts is asynchronously triggered by the arrival at the detector end of the measuring tube 61 of a specific crossing belonging to the preceding ultrasonic burst. The specific crossing which triggers the retransmit command is the first crossing of the quiescent signal level 45 of the required polarity (positive- or negative-going) to arrive after the delay counter 123 has timed out. The polarity required for a crossing to generate a retransmit depends on the polarity of the preceding transmit. A comparator 126 is provided to detect these crossings and includes inputs connected to the signal reference 86 and the bandpass filter 84. An output of the comparator 126 connects to the transmit controller 121 to trigger a re-transmit command.

The delay is re-loaded into the delay counter 123 at the start of the next ultrasonic burst and immediately commences to count. The timing counter 125 is stopped by the arrival at the detector of the specific crossing belonging to the last ultrasonic burst. This specific crossing is also identified by the delay counter 123. At the end of a series of ringarounds, the value in the high speed timing counter 125 is transferred to the microprocessor 65. The second (opposite) transmission direction is selected and the above sequence is repeated. The stored high-speed counter 125 values for both directions are used by software in the microprocessor 65 to calculate the flow rate for the scan period. The time taken by the sequence as a whole can be divided by the number of bursts transmitted to determine the average travel time.

Figure 10A:
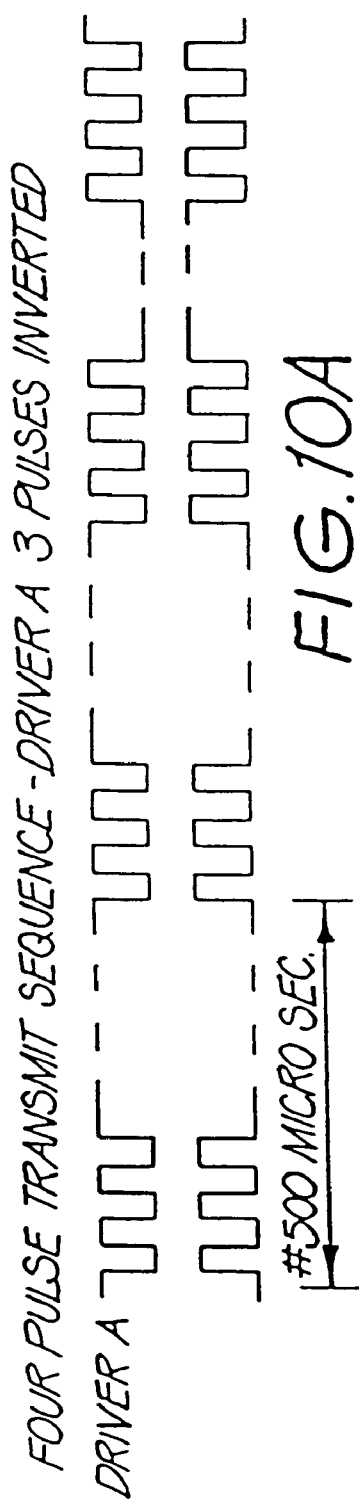
FIGS. 10A and 10B illustrate the firing sequence for the transducers in the embodiment of FIG. 9.
Figure 10B:
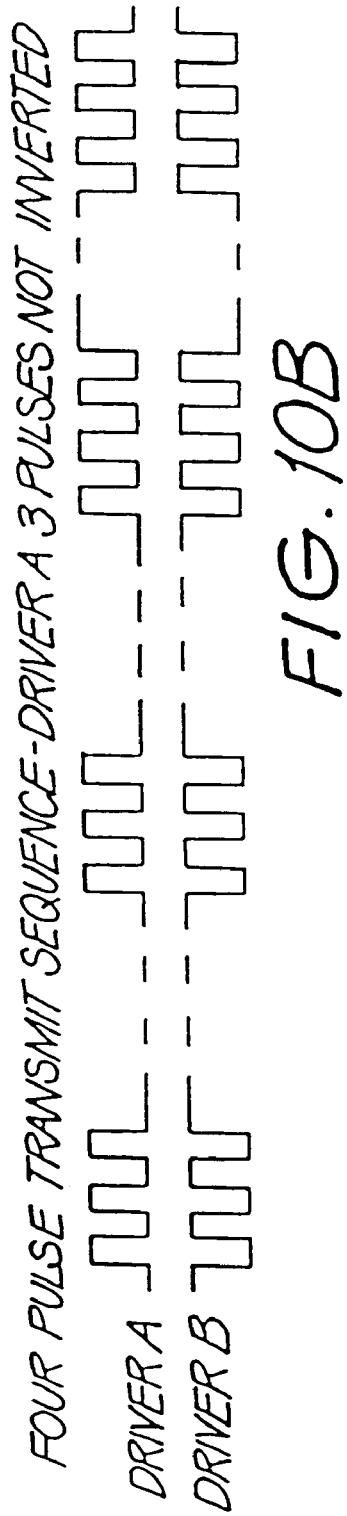

A ringaround sequence is usually made up of groups of four firings. This sequence of firings is depicted in FIGS. 10A and 10B. The sequence of four is made up of three pulses of one polarity while the third is inverted with respect to the first three pulses.

To keep the polarity reversal away from important events, the polarity change is achieved by adding an extra edge on the end of the transmit pulse sequence prior to the transmit having a different polarity. In a group of four firings, the signal inverts after the third and restores on the fourth firing.

A ringaround sequence consists of, typically, 64 acoustic transmissions in each direction, all but the first being triggered by reception of the preceding transmission. To assist in cancel the buildup of coherent acoustic noise in the measurement tube as the ringaround sequence proceeds, the polarity of the transmitted signal is reversed on a regular basis throughout the sequence. The sequence is notionally made up of groups of four transmissions, with the polarity of every fourth transmission reversed with respect to the other three. Thus, if the two possible polarities are designated "A" and "B", a sequence of 64 transmissions could have a polarity pattern of "AAABAAABAAAB . . . ", the "AAAB" pattern being repeated 16 times overall. The polarity of the crossing comparator 126 on the received signal is reversed just after a "B" polarity transmission and changed back again just after the first following "A" polarity transmission to ensure that it matches the received signal polarity. Further, to cancel errors which might be introduced due to offset on the comparator 126, the overall polarity of the ringaround sequence is reversed for each complete gas velocity measurement. Thus the polarity sequence above becomes "BBBABBBABBBA . . . ", again with the appropriate reversals of the polarity of the crossing comparator 126 on every fourth transmission.

Figure 11A:
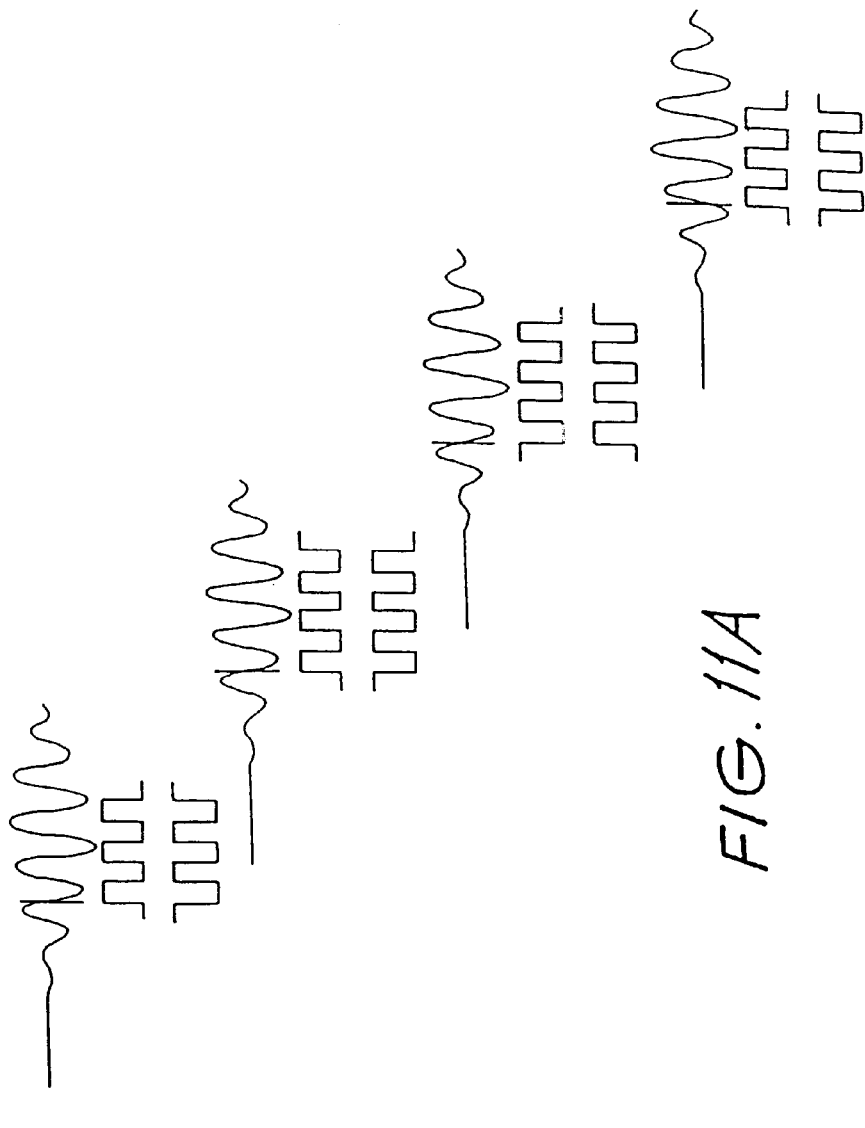
FIGS. 11A and 11B illustrate the timing of that firing sequence of FIGS. 10A and 10B for the two transducer drivers in the embodiment of FIG. 9.
Figure 11B:
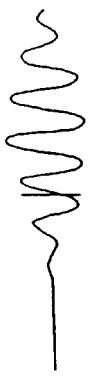
Figure 11B:
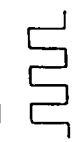
Figure 11B:
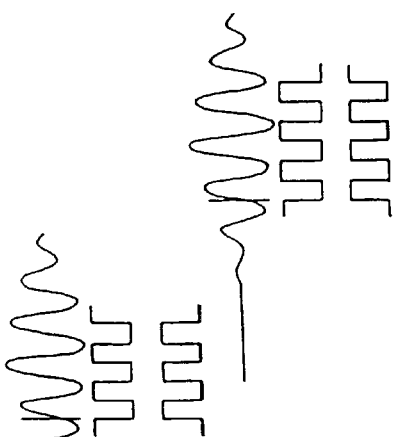
Figure 11B:
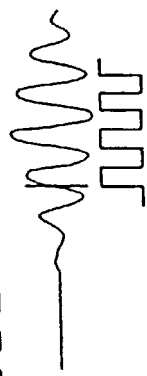
Figure 11B:
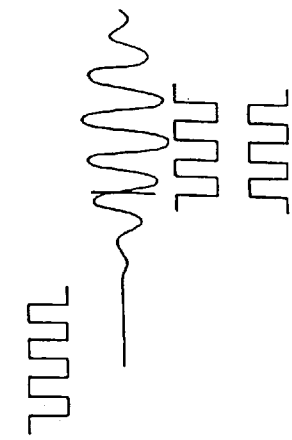

A typical timing diagram for such a measurement sequence is depicted in FIGS. 11A and 11B.

Figure 12:
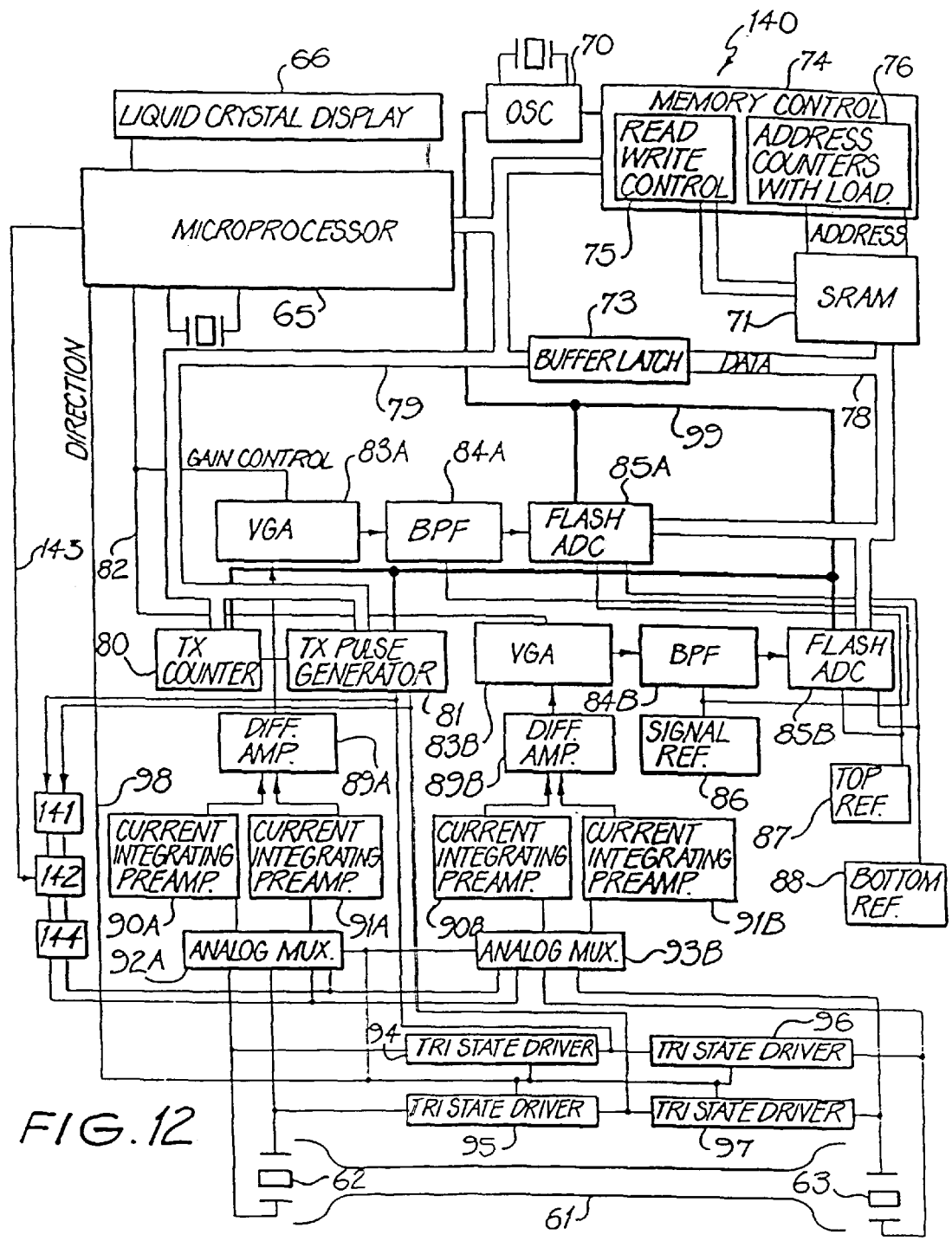
FIG. 12 is a schematic block diagram representation of a third embodiment in which the two ultrasonic transducers transmit simultaneously.

A further embodiment of the invention comprises a measurement system 140 schematically depicted in FIG. 12 and in which transmission of the ultrasonic signal simultaneously occurs in both directions relative to the direction of fluid flow. Again, like reference numerals are used for like components having like functions, some components have again been omitted for the sake of clarity.

This embodiment is suitable for rapidly changing flows such as occurs in peak flow meters. Transmission occurs from both transducers 62 and 63 at the same time, then at a suitable time later (advantageously about 500 µs in natural gas) both transducers 62 and 63 are used as receivers for the signal transmitted by the other transducer. Two separate sets of receive electronics are required, which correspond in function to those of FIGS. 7 and 9, but whose components are respectively identified using the suffixes A and B.

It is extremely difficult to make the two sets of receive electronics sufficiently identical in order to avoid introducing significantly different phase delays. These phase delays vary with conditions such as temperature and gain.

To cancel out such an introduced phase difference, a filtered and attenuated version of the transmit signal is connected to both receivers. This is achieved by passing the outputs of the transmit pulse generator 81 firstly through a filter 141 and then to a variable attenuator 142 controlled by a control signal 143 output from the microprocessor 65. The variable attenuator 142 outputs to a fixed attenuator 144 which supplies two analog multiplexers 92A and 93B, which are of similar construction to the multiplexers 92 and 93 of the previous embodiments, excepting they are each of a double-pole-double-throw construction, rather than a single-pole-double-throw construction as used previously. This signal is processed by both sets of receive electronics and stored in the memory 77. Because of the need to store two sets of received data, the memory 77 is modified to simultaneously store double bytes (16 bits) of data and thus has a preferred total capacity of 64 Kbits. The signal is filtered so that its transition time is greater than eight cycles of the high frequency clock. This allows each flash ADC 85A, 85B to obtain sufficient samples for an interpolation. The difference in phase delay can be calculated from this stored signal and used to calculate the correct time difference for the upstream and downstream directions.

The actual measurement procedure for this embodiment can then follow the following sequence:

1. The tri-state drivers 94–97 to the up and down transducers 62,63 are enabled. Both receivers A and B are connected to a transmit signal that has been filtered, attenuated, and amplitude adjusted. Both sets of receive electronics are enabled and a first block of the memory 77 is selected.
2. The address counter 76 is enabled and the signal transmitted in both directions. Data, typically corresponding to only a few cycles, from both sets of receive electronics are stored in the first block of the memory 77. That data permits the phase delay calculation discussed above.
3. The receive electronics are disabled and a second, generally much larger, block of the memory 77 is selected. The multiplexers 92A, 93B are changed so that the transducers are connected to the receive electronics.
4. To conserve power, the receive electronics are disabled until just before the ultrasonic pulses are due to arrive.
5. Both sets of receive electronics are enabled and data from both sets of receive electronics are stored in the second block of the memory 77.

In such a scheme, during the transmit sequence a much reduced version of the signal is coupled into the two preamplifiers. The amplitude of this signal is variable so as to accommodate different gains in the receiving amplifiers. This transmit signal passes through the amplifier chain and the flash ADC's and is stored in the memory. The multiplexers are then changed so as to receive the signal from the transducers and a higher order, non-counting, memory address line is changed. The lower bits of the address counter 76 continue to count. The receive electronics (preamplifier, variable gain amplifier, filter, flash ADC's and memory) are all disabled until it is time to receive the ultrasonic pulse.

The data in the first block of the memory 77 is used then to determine the current phase delay in the manner described above. The same process is then applied to the data in the second block of the memory 77. The phase difference for each direction is then determined. The actual times of propagation are then determined using that data from the second block of the memory 77, and are adjusted where appropriate by the calculated phase difference and then retained for averaging.

In each of the embodiments, once the microprocessor 65 determines the average flow rate, that value can then be used to calculate the flow volume which can be incrementally retained. The flow rate and incremental volume over a period of time can then be displayed by the LCD 66. Such information can also be communicated via the serial interface 67 to a data acquisition system. Typically, flow rate calculations can be enabled at periodic intervals, generally between 0.5 seconds and 60 seconds. Preferably the interval is about 2 seconds.

It will thus be apparent from the foregoing embodiments that the general method relies on the conversion of the analogue wave packet signal to digital information, and the subsequent use of this digital information, by comparison with a standard digital template of selected waveform features, both to uniquely identify a number of particular cycles of the waveform and to combine this information to give an elapsed time measurement of significantly reduced uncertainty for the arrival of the received wave packet.

Further, a preferred implementation allows the response of the electronics of the system to the no-received signal (NRS) state to be measured. This is achieved by averaging the digitized data taken before the arrival of the signal.

The preferred implementation also allows the slope of the voltage waveform as a function of time to be determined by a technique of fitting the data pairs of voltage and time to a straight line using the least-squares technique.

The value of the maximum slope allows the amplitude of the signal to be estimated and hence, by adjustment of the gain of the amplifiers, for the amplitude of the received signal to be held constant or within a predetermined range of magnitudes. It then follows that the magnitude of the slopes of the signal lie within a predetermined range of magnitudes.

Using the slopes of this essentially constant amplitude signal, it is possible to determine the absolute position in the waveform of any feature by reference to a stored template. The feature used as a timing marker in the timing of the transit of the signal down the tube is a particular one of the several occasions when the waveform passes through the NRS state.

The exact time that the waveform passes through the NRS state is determined from the function fitted to the data pairs mentioned above. This allows the timing accuracy to be enhanced by effectively interpolating between clock pulses, thus overcoming the quantization that would otherwise be present.

The preferred implementation of the present invention confers certain advantages in its use as an ultrasonic signal timing technique.

Firstly, the preferred method is less affected by temperature than other methods because it uses the leading part of the wave packet. This leading part of the wave packet consists principally of the plane wave and this is much less affected by temperature than are the higher order modes forming the latter part of the wave packet.

The preferred method also makes major use of a quantification of the slope of the waveform as it makes a transition from a negative to a positive peak or vice versa. An array of slopes is used to describe the waveform in a simple and concise way. This also gives the user the ability to compare waveforms with a minimum of data. The transition slope also confers the ability to identify the position of the transition within the waveform and thus calculate the position of the beginning of the waveform. Each transition slope can also be used to infer the amplitude of the accompanying peak and can be used as an alternative parameter to the peak height, and thus the transition slope provides a useful parameter for the adjustment of gain in the system.

Further, the selection of only a portion of the amplitude of the waveform can be used judiciously to increase the accuracy obtainable from the method. In the preferred embodiment, an increase of accuracy corresponding to approximately 1.6 bits is obtained by operating the analogue-to-digital converter over a window covering approximately the middle one-third of the received signal. The data describing the transitions are thus more accurately defined and it is therefore possible to have more resolution in the timing. This is possible because the preferred method does not use the peaks of the envelope for any measurement purpose and it is therefore possible to ignore them and use the transition slope only.

The preferred method also confers the ability to accommodate any changes in the ultrasonic signal which might accompany the ageing of, or any damage to, a transducer assembly, by slowly updating the template against which the waveform is compared. This is possible because the method permits a large degree of difference in the size and shape of the waveform while still obtaining a correct determination of the absolute position of the timing marker within it.

In addition, by using a number of the transition slopes, the preferred method makes more use of a greater percentage of the information in the waveform, rendering it more versatile and increasing the precision with which the timing measurement is made.

Using a specific implementation, it is possible to process all of the data in a single scan. This requires less time and energy, and thus results in greater unattended battery life for any system using it, than methods which require the data to pass through the processor more than once.

The foregoing describes only a number of embodiments of the present invention and modifications, obvious to those skilled in the art, can be made thereto without departing from the scope of the present invention.

What is claimed is:

1. A method of detecting an arrival time at a transducer of an acoustic wave packet transmitted at a predetermined frequency, said method comprising the steps of:
   (a) transmitting an acoustic wave packet at a predetermined frequency;
   (b) detecting at a transducer the acoustic wave packet and producing an analogue signal output;
   (c) converting, at a sampling frequency, the analogue signal output from said transducer into digital signal data having consequential spacing;
   (d) determining a measurement portion of said digital signal data, said measurement portion corresponding to a response of said transducer to said acoustic wave packet;
   (e) determining from said measurement portion a plurality of slopes $S_i$ for a corresponding plurality i, where i is an integer between zero and 20, of measurement segments of said response, each of said segments being about a signal level value V; and
   (f) determining from at least selected ones of said slopes $S_i$, an arrival time t of said acoustic wave packet.

2. A method as claimed in claim 1, comprising the further step, between steps (e) and (f) of:
   (ea) determining, for selected ones of said segments, a corresponding measurement time $A_i$ indicative of a time at which said response intercepts said signal level value V;
   wherein step (f) comprises determining said arrival time t from said corresponding measurement times $A_i$.

3. A method as claimed in claim 2, comprising the further step, between steps (e) and (ea) of:
   (eaa) matching said slopes $S_i$ with a corresponding reference set of slopes $P_j$ to determine a measurement position of each of said segments in said measurement portion;
   wherein step (ea) comprises determining said corresponding measurement times $A_i$ from the corresponding one of said measurement positions.

4. A method as claimed in claim 3, wherein step (eaa) includes associating each slope $P_j$ of said reference set of slopes with a specific position parameter n, where said specific position parameter n marks a position corresponding to a signal polarity transition within said wave packet, and where each specific position parameter n, corresponds to an integral number of half-wave periods of said wave packet between a beginning of said wave packet corresponding to the arrival time of the wave packet and the corresponding signal polarity transition within said wave packet.

5. A method as claimed in claim 4, further comprising updating said reference set of slopes over time to compensate for changes in a resonant frequency of said analogue signal.

6. A method as claimed in claim 5, wherein updating said reference set of slopes includes following a slow-moving average of said slopes $S_i$.

7. A method as claimed in claim 4, where step (f) comprises the sub-steps of:
   (fa) assigning a weighting factor $W_i$ to each of said measurement times $A_i$ based upon the corresponding position parameter n;
   (fb) selecting a number m of said measurement times $A_i$ for use in the determination of the arrival time t;
   (fc) determining a mean half-wave period $\tau$ from time intervals between adjacent ones of said number m of selected measurement times $A_i$;
   (fd) determining, for each of the number m of selected measurement times $A_i$, an estimated arrival time $t_i$ of said wave packet at the transducer;
   (fe) determining a sum, over the number m of measurement times $A_i$, of a product of the weighting factor $W_i$ assigned to each of said measurement times and the corresponding estimated arrival time $t_i$; and
   (ff) determining the arrival time t of said acoustic wave packet by dividing the sum determined in step (fe) by a sum of each weighting factor $W_i$ assigned to each of the number m of measurement times m.

8. A method as claimed in claim 7, wherein step (fd) comprises determining the estimated arrival time $t_i$ using the expression $t_i=A_i-n\cdot\tau$, wherein $A_i$ are the measurement times, n is the corresponding position parameter, and $\tau$ is the mean half-wave period.

9. A method as claimed in claim 7, wherein step (fa) includes assigning a weighting factor $W_i$, which is proportional to the slope $S_i$, of the corresponding one of said segments.

10. A method as claimed in claim 7, wherein step (fb) includes selecting a number m having a value from 2 to 20 of said measurement times $A_i$ for use in the determination of the arrival time t.

11. A method as claimed in claim 7, wherein step (fb) includes selecting 6 of said measurement times $A_i$ for use in the determination of the arrival time t.

12. A method as claimed in claim 7, wherein step (fb) comprises selecting said measurement times $A_i$ so as to give a closest match to the reference set of slopes Pj.

13. A method as claimed in claim 2, wherein step (e) comprises allocating a set of points including an integer k number of points of said digital signal data to each said measurement segment i, each said measurement segment i being centered around two adjacent points, each of the two adjacent points having a value which lies on alternative sides of said signal level value V, fitting a straight line to each set of points, and then determining the slope $S_i$ of each said straight line.

14. A method as claimed in claim 13, wherein fitting a straight line to each set of points includes fitting a straight line to each of said two adjacent points.

15. A method as claimed in claim 13, wherein allocating a set of points including an integer k number of points includes deriving a value for k from a ratio of the sampling frequency to said predetermined frequency at which said acoustic wave packet is transmitted, and to the consequential spacing of said digital signal data in said measurement portion.

16. A method as claimed in claim 15, wherein allocating a set of points including an integer k number of points includes determining a value of k equal to one eighth of a number of cycles of the sampling frequency per cycle of said predetermined frequency at which said acoustic wave packet is transmitted.

17. A method as claimed in claim 16, where allocating a set of points including an integer k number of points includes allocating a set of 10 points of said digital signal data to each said measurement segment i.

18. A method as claimed in claim 1, wherein step (a) includes, prior to transmitting an acoustic wave packet, generating said acoustic wave packet using said sampling frequency and determining said predetermined frequency at which said acoustic wave packet is transmitted as a submultiple of said sampling frequency.

19. A method as claimed in claim 1, wherein step (e) includes deriving said signal level value V by averaging said digital signal data received in advance of said measurement portion.

20. A method as claimed in claim 1, wherein step (c) comprises converting continuously said analogue signal.

21. A method as claimed in claim 1, further comprising determining a maximum magnitude of one of said slopes $S_i$, estimating a maximum amplitude of said analogue signal from said maximum magnitude of one of said slopes $S_i$, and using said estimation to maintain said maximum amplitude at a substantially constant level.

22. A method as claimed in claim 1, wherein step (c) comprises, before said converting, the step of:
   (ca) adjusting a gain of one or more amplifiers thereby adjusting an amplitude of said analogue signal such that a maximum amplitude of said analogue signal is held substantially constant over a number of received acoustic wave packets.

23. A method as claimed in claim 22, wherein step (ca) includes determining a magnitude of a maximum one of said slopes $S_i$, using the magnitude of the maximum one of said slopes $S_i$ for adjusting the amplitude of said analogue signal, maintaining said maximum amplitude at a substantially constant value, and maintaining said maximum slope within a predetermined range of magnitudes.

24. A method of determining a propagation time of an acoustic wave packet transmitted between two ultrasonic transducers, said method comprising the steps of:
   (g) starting a clock operating at a clock operating frequency;
   (h) simultaneously with a transition of said clock, the steps of:
      (ha) energizing a first one of two transducers to output an acoustic wave packet at an energizing frequency which is lower than said clock operating frequency, and
      (hb) maintaining said clock as a timing reference for subsequent detection of an arrival of said wave packet at a second one of two transducers;
   (i) detecting an arrival time of said wave packet using the method as claimed in claim 1, wherein said sampling frequency is said clock operating frequency and is provided by said clock, and said digital signal data including said measurement portion is stored in a memory having an address determination for consecutive samples of said digital signal data being altered by said clock such that each address in said memory corresponds to an identifiable time which is identifiable after generation of said acoustic wave packet.

25. A method as claimed in claim 24, further comprising transmitting a plurality of additional acoustic wave packets between the two ultrasonic transducers and, excepting a first transmission, synchronizing the transmission of all subsequent acoustic wave packets to the detection of the arrival of an immediately preceding acoustic wave packet.

26. A method as claimed in claim 25, wherein synchronizing the transmission of all subsequent acoustic wave packets includes counting a time delay upon transmission of a particular acoustic wave packet and instituting the transmission of a next acoustic wave packet after said delay time has elapsed and when said measurement portion corresponding to said particular acoustic wave packet next crosses said signal level value.

27. A method as claimed in claim 24, wherein step (h) further comprises, at the same time the first one of two transducers is energized, energizing said second one of two transducers and outputting an acoustic wave packet for reception by the first one of two transducers, detecting the arrival of the acoustic wave packet at the first one of said transducers, and determining a propagation time of the acoustic wave packet from the second one of said transducers.

28. A method as claimed in claim 27, wherein step (c) further comprises compensating for phase differences between said digital signal data converted from analogue signals output from respective ones of said transducers.

29. The method of claim 1, wherein step (c) comprises converting, at a sampling frequency having a value between 500 kHz and 10 GHz, the analogue signal output from said transducer into digital signal data having consequential spacing.

30. The method of claim 1, wherein step (c) comprises converting, at a sampling frequency having a value of 10 MHz, the analogue signal output from said transducer into digital signal data having consequential spacing.

31. The method of claim 1, wherein step (a) comprises transmitting an acoustic wave packet at a predetermined frequency having a value between 20 kHz and 5 MHz.

32. The method of claim 1, wherein step (a) comprises transmitting an acoustic wave packet at a predetermined frequency having a value of 125 kHz.

33. A method of estimating an arrival time at a transducer of an acoustic wave packet transmitted at a predetermined frequency, said method comprising the steps of:

(a) transmitting an acoustic wave packet at a predetermined frequency;

(b) detecting at a transducer the acoustic wave packet and producing an analogue signal;

(c) converting an analogue signal output from said transducer into digital signal data;

(d) determining a plurality of waveform periods from said digital signal data including a waveform period determined for each of a number of different segments of said analogue signal;

(e) averaging the plurality of waveform periods for obtaining an average waveform period, and (f) using the average waveform period and a corresponding number of waveform periods between a determined reference point and a point marking a start of the acoustic wave packet to estimate an arrival time of the acoustic wave packet by subtracting from an arrival time of the determined reference point the corresponding number of waveform periods multiplied by the average waveform period.

34. A method as claimed in claim 33, wherein step (d) comprises determining a plurality of slopes corresponding to transitions of said analogue signal about a predetermined signal level, and using said slopes to determine the waveform period between adjacent ones of said slopes.

35. A method as claimed in claim 34, wherein step (d) includes comparing the plurality of slopes with a set of reference slopes, identifying from the comparison with the set of reference slopes a specific location in said analogue signal, and determining from the specific location in said analogue signal, using the average waveform period, the arrival time.

36. A method as claimed in claim 35, further comprising modifying said set of reference slopes over time, tracking the changes in said plurality of slopes, and thereby compensating for deviations from said predetermined frequency at which said acoustic wave packet is transmitted as detected by said transducer.

37. A system for measuring a speed of a moving fluid, said system comprising:

a measurement tube through which the fluid passes;

two ultrasonic transducers disposed in said tube and configured for transmitting ultrasonic signals between each other;

exciting means, coupled to at least a first one of said transducers, for exciting at least said first one of said transducers to generate an acoustic wave packet that propagates at a predetermined frequency along said tube toward a second one of said transducers;

detecting means connected to at least said second one of said transducers for detecting the acoustic wave packet, converting means, coupled to said detecting means, for converting at a sampling frequency an analogue signal output from at least said second one of said transducers to digital signal data, a first storage means for storing said digital signal data from said converting means;

processor means connected to said first storage means for determining the speed of the fluid, said processor means comprising:

first determining means for determining a measurement portion of said digital signal data, said measurement portion corresponding to a response of said second one of said transducers to said acoustic wave packet;

second determining means for determining from said measurement portion a plurality of slopes $S_i$ for a corresponding plurality i of measurement segments of said response, each of said segments being about a signal level value V;

third determining means for determining from at least selected ones of said slopes $S_i$, an arrival time t of said acoustic wave packet.

38. A system as claimed in claim 37 further comprising fourth determining means for determining, for selected ones of said segments, a corresponding measurement time $A_i$ indicative of a time at which said response intercepts said signal level value, wherein said third determining means determines said arrival time t from said corresponding measurement times $A_i$.

39. A system as claimed in claim 38, further comprising second storage means connected to said processor means for storing a reference signal, said processor means including fifth determining means arranged to match parts of said reference signal with said measurement portion to determine a measurement position of each of the segments in the measurement portion, wherein said measurement times $A_i$ are determined using a corresponding one of said measurement positions.

40. A system as claimed in claim 37, further comprising adjusting means, coupled to at least said second one of said transducers, for adjusting a magnitude of said analogue signal from at least said second one of said transducers to fall between certain limits, said certain limits being equally displaced either side of said signal level value, said signal level value preferably being an average of an output of said second transducer before said measurement portion.

41. A system as claimed in claim 37, further comprising altering means, coupled to at least said second one of said transducers, for altering an amplitude of said analogue signal detected by said receiving means such that a maximum amplitude of said analogue signal is held substantially constant over a number of received acoustic wave packets.

42. A system as claimed in claim 41, wherein said altering means uses a magnitude of a maximum one of said slopes $S_i$ to adjust the amplitude to maintain said maximum amplitude substantially constant and thereby said maximum slope within a predetermined range of magnitudes.

43. The system of claim 37, wherein said sampling frequency is between 500 kHz and 10 GHz.

44. The system of claim 43, wherein said sampling frequency is 10 MHz.

45. The system of claim 44, wherein said predetermined frequency at which said acoustic wave packet propagates is between 20 kHz and 5 MHz.

46. The system of claim 45, wherein said predetermined frequency at which said acoustic wave packet propagates is 125 kHz.

* * * * *

UNITED STATES PATENT AND TRADEMARK OFFICE
CERTIFICATE OF CORRECTION

PATENT NO. : 6,305,233 B1
DATED : October 23, 2001
INVENTOR(S) : Braathen et al.

It is certified that error appears in the above-identified patent and that said Letters Patent is hereby corrected as shown below:

Column 15,
Line 38, "$G_n = G_0 + C_1 - C_2 \cdot (\sqrt[3]{(S_n \cdot C_3)})$" should read -- $G_n = G_0 + C_1 - C_2 \cdot (\sqrt[3]{(S_n - C_3)})$ --.

Signed and Sealed this

Twelfth Day of March, 2002

Attest:

JAMES E. ROGAN
*Attesting Officer*     *Director of the United States Patent and Trademark Office*